US012427417B2

(12) United States Patent
Chen et al.

(10) Patent No.: US 12,427,417 B2
(45) Date of Patent: Sep. 30, 2025

(54) METHOD AND APPARATUS FOR CONTROLLING OBJECT IN VIRTUAL SCENE, ELECTRONIC DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Xiaofeng Chen, Shenzhen (CN); Jiayuan Cen, Shenzhen (CN); Yucun Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 242 days.

(21) Appl. No.: 18/347,823

(22) Filed: Jul. 6, 2023

(65) Prior Publication Data
US 2023/0347244 A1  Nov. 2, 2023

Related U.S. Application Data

(63) Continuation of application No. PCT/CN2022/115242, filed on Aug. 26, 2022.

(30) Foreign Application Priority Data

Oct. 8, 2021 (CN) .......................... 202111170948.8

(51) Int. Cl.
*A63F 13/537* (2014.01)
*A63F 13/52* (2014.01)
(Continued)

(52) U.S. Cl.
CPC ............ *A63F 13/537* (2014.09); *A63F 13/52* (2014.09); *A63F 13/58* (2014.09); *A63F 13/573* (2014.09);
(Continued)

(58) Field of Classification Search
CPC .......... A63F 13/25; A63F 13/44; A63F 13/50; A63F 13/537; A63F 13/52; A63F 13/58;
(Continued)

(56) References Cited

U.S. PATENT DOCUMENTS 9,511,280 B1    12/2016  Hawk et al.
2004/0077405 A1  4/2004  Watanabe
(Continued)

FOREIGN PATENT DOCUMENTS

CN     104346507 A     2/2015
CN     107913521 A     4/2018
(Continued)

OTHER PUBLICATIONS

The Japan Patent Office (JPO) Notice of Reasons for Refusal for Application No. 2023-571407 Nov. 12, 2024 * Pages (including translation).
(Continued)

*Primary Examiner* — Omkar A Deodhar
(74) *Attorney, Agent, or Firm* — ANOVA LAW GROUP PLLC

(57) ABSTRACT

A method for controlling an object in a virtual scene for an electronic device includes: controlling, in response to a first interaction control instruction, a virtual object to perform an interactive operation indicated by the first interaction control instruction; controlling, in response to a second interaction control instruction for a copy skill, the virtual object to cast the copy skill including creating a copy of the virtual object in the virtual scene; controlling, in response to a third interaction control instruction, the copy to perform an interactive operation indicated by the third interaction control instruction; removing the copy from the virtual scene in response to that a disappearing condition of the copy of the virtual object is satisfied; and controlling, in response to a
(Continued)

fourth interaction control instruction, the virtual object to perform an interactive operation indicated by the fourth interaction control instruction.

15 Claims, 14 Drawing Sheets

(51) Int. Cl.
    *A63F 13/58*       (2014.01)
    *A63F 13/573*     (2014.01)
    *A63F 13/577*     (2014.01)

(52) U.S. Cl.
    CPC ....... *A63F 13/577* (2014.09); *A63F 2300/308* (2013.01)

(58) Field of Classification Search
    CPC .......... A63F 13/56; A63F 13/67; A63F 13/70; A63F 2300/306; A63F 2300/55; A63F 2300/5553; A63F 2300/57; A63F 2300/60; A63F 2300/609; A63F 2300/65; A63F 2300/66; A63F 2300/6623
    See application file for complete search history.

(56) References Cited

U.S. PATENT DOCUMENTS

| | | | |
|---|---|---|---|
| 2019/0255442 A1* | 8/2019 | Broadway | G06F 30/20 |
| 2023/0030260 A1* | 2/2023 | Jauvin | A63F 13/53 |
| 2023/0064652 A1* | 3/2023 | Davey | G06T 15/20 |
| 2024/0115944 A1 | 4/2024 | Wei et al. | |

FOREIGN PATENT DOCUMENTS

| | | |
|---|---|---|
| CN | 111111166 A | 5/2020 |
| CN | 111467802 A | 7/2020 |
| CN | 113797536 A | 12/2021 |
| JP | 2020039404 A | 3/2020 |
| KR | 20150075345 A | 7/2015 |
| WO | 2019091463 A1 | 5/2019 |

OTHER PUBLICATIONS

The World Intellectual Property Organization (WIPO) International Search Report for PCT/CN2022/115242 Nov. 9, 2022 13 Pages (including translation).
"Cao Cao's eldest cousin, who killed 11 people in 7 minutes in the peak competition, became the greatest hero. Athena resurrected and stole the house!", "Bilibili, online, search date Oct. 24, 2022 https://www.bilibili.com/video/BV1sW411d7QH/ spm_id_from 333. 337.seach-card.all.click22.html", Jul. 9, 2018 (Jul. 9, 2018).
Korean Intellectual Property Office (KIPO) Office Action 1 for Application No. 2023-7031884 Apr. 3, 2025 29 Pages (including translation).
[Shaco 2 Clone Bug Activation Conditions] Clone damage recognized as the main body is the same? Returns together when going home + Infinite Summoning Possible', YouTube video (Apr. 3, 2020), <https://www.youtube.com/watch?v=t8W29oejMQA>.
'The king's father: 7 minutes from the start, 11 days to the death, the end of life, the end of life, the end of life, the family's recovery!', bilibili Posted video, Sep. 7, 2018, <https://www.bilibili.com/video/BV1sW411d7QH/?spm_id_from=333.337.search-card.all.click>.
'The King: New hero Mowgli demo, big move summons huge monster', video posted on YouTube, (May 15, 2020), <https://www.youtube.com/watch?v=MkeEzsYQcz8>The King: New hereo Mowgli demo, big move summons huge monster.

* cited by examiner

METHOD AND APPARATUS FOR CONTROLLING OBJECT IN VIRTUAL SCENE, ELECTRONIC DEVICE, STORAGE MEDIUM, AND PROGRAM PRODUCT

RELATED APPLICATIONS

This application is a continuation application of PCT Patent Application No. PCT/CN2022/115242, filed on Aug. 26, 2022, which claims priority to Chinese Patent Application No. 202111170948.8, filed on Oct. 8, 2021, content of all which is hereby incorporated by reference in its entirety.

FIELD OF TECHNOLOGY

This disclosure relates to the field of virtualization and human-computer interaction technologies and, in particular, to a method and an apparatus for controlling an object in a virtual scene, an electronic device, a computer-readable storage medium, and a computer program product.

BACKGROUND

With development of computer technologies, an electronic device may implement a richer and more visual virtual scene. The virtual scene is a digital scene created by a computer based on a digital communication technology. A user may get experience of complete virtualization (for example, virtual reality) or partial virtualization (for example, augmented reality) in visual and auditory aspects and the like in the virtual scene, and in addition, may interact with various objects in the virtual scene, or control interaction between various objects in the virtual scene, to obtain feedbacks.

In the related art, when a virtual object controlled by the user in the virtual scene disappears (for example, the virtual object is killed), the virtual object may reappear in the virtual scene through a resurrection mechanism. However, an interaction attribute (for example, an attack value, a defense value, or virtual equipment and a virtual prop the virtual object is fitted with) of the virtual object resurrected by the resurrection mechanism in the related art is often in an initial state, and the user needs to perform a plurality of human-computer interaction operations (for example, fitting the virtual object with virtual equipment, obtaining virtual props, and controlling interaction of the virtual object to improve the defense value and the attack value) from the initial state again to resume the interaction attribute. As a result, a processing resource of a device is wasted, and human-computer interaction efficiency is low.

SUMMARY

Embodiments of this disclosure provide a method and an apparatus for controlling an object in a virtual scene, an electronic device, a computer-readable storage medium, and a computer program product. Human-computer interaction efficiency and utilization of a processing resource of a device can be improved.

One aspect of this disclosure provides a method for controlling an object in a virtual scene for an electronic device. The method includes: controlling, in response to a first interaction control instruction, a virtual object to perform an interactive operation indicated by the first interaction control instruction; controlling, in response to a second interaction control instruction for a copy skill, the virtual object to cast the copy skill including creating a copy of the virtual object in the virtual scene; controlling, in response to a third interaction control instruction, the copy to perform an interactive operation indicated by the third interaction control instruction; removing the copy from the virtual scene in response to that a disappearing condition of the copy of the virtual object is satisfied; and controlling, in response to a fourth interaction control instruction, the virtual object to perform an interactive operation indicated by the fourth interaction control instruction Another aspect of this disclosure provides an electronic device for controlling an object in a virtual scene. The electronic device includes a memory, configured to store computer-executable instructions; and at least one processor, configured to execute the computer-executable instructions stored in the memory to perform: controlling, in response to a first interaction control instruction, a virtual object to perform an interactive operation indicated by the first interaction control instruction; controlling, in response to a second interaction control instruction for a copy skill, the virtual object to cast the copy skill including creating a copy of the virtual object in the virtual scene; controlling, in response to a third interaction control instruction, the copy to perform an interactive operation indicated by the third interaction control instruction; removing the copy from the virtual scene in response to that a disappearing condition of the copy of the virtual object is satisfied; and controlling, in response to a fourth interaction control instruction, the virtual object to perform an interactive operation indicated by the fourth interaction control instruction.

Another aspect of this disclosure provides a non-transitory computer-readable storage medium. The non-transitory computer-readable storage medium stores computer-executable instructions executable by at least one processor to implement: controlling, in response to a first interaction control instruction, a virtual object to perform an interactive operation indicated by the first interaction control instruction; controlling, in response to a second interaction control instruction for a copy skill, the virtual object to cast the copy skill including creating a copy of the virtual object in the virtual scene; controlling, in response to a third interaction control instruction, the copy to perform an interactive operation indicated by the third interaction control instruction; removing the copy from the virtual scene in response to that a disappearing condition of the copy of the virtual object is satisfied; and controlling, in response to a fourth interaction control instruction, the virtual object to perform an interactive operation indicated by the fourth interaction control instruction

DESCRIPTION OF EMBODIMENTS

Figure 1:
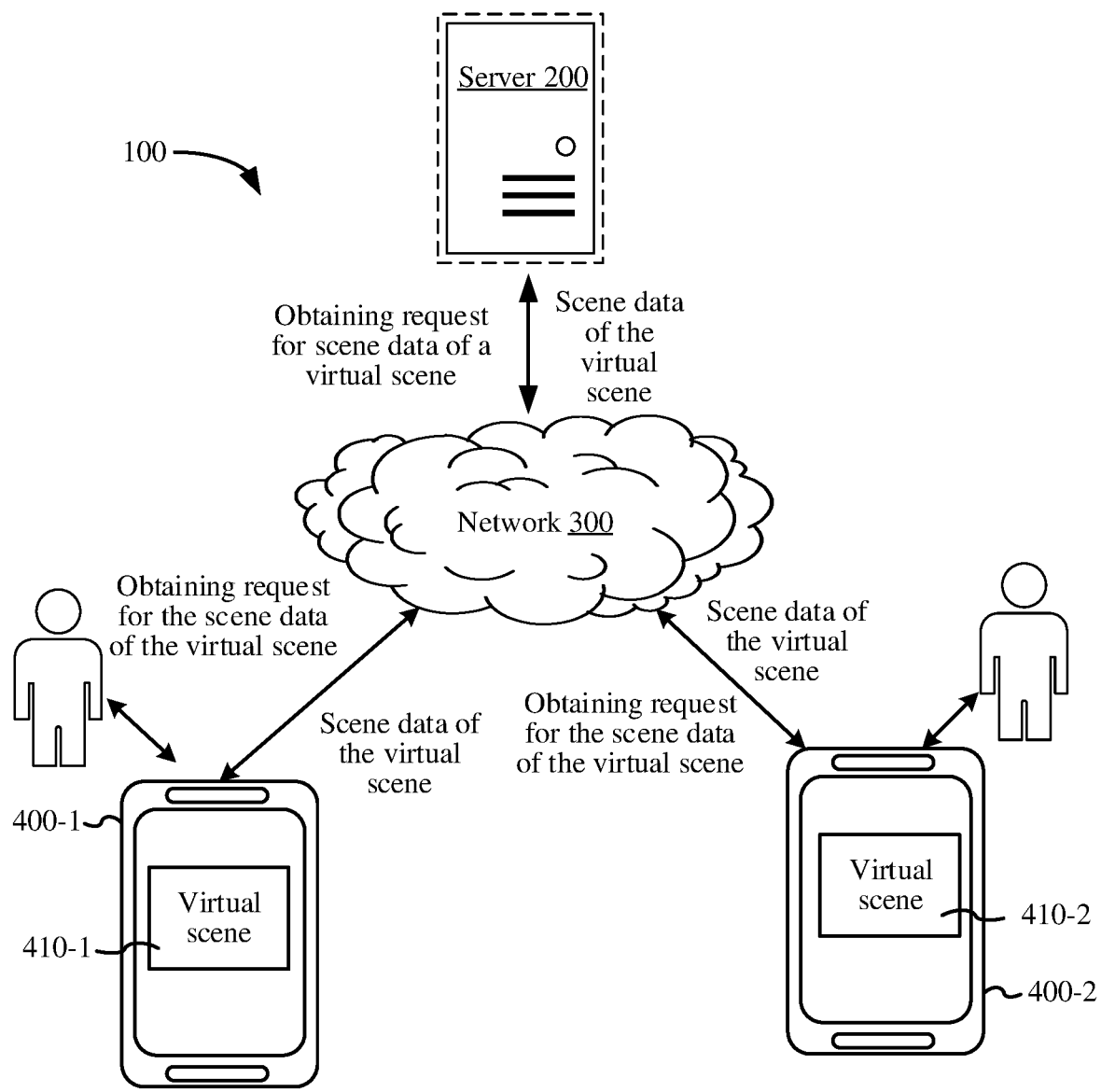
FIG. 1 is a schematic diagram of an architecture of a system for controlling an object in a virtual scene according to an embodiment of this disclosure.

To make the objectives, technical solutions, and advantages of this disclosure clearer, the following further describes certain embodiments of this disclosure in detail with reference to the accompanying drawings. The described embodiments are not to be considered as a limitation on this disclosure. All other embodiments obtained by a person of ordinary skill in the art without creative efforts shall fall within the protection scope of this disclosure.

"Some embodiments" involved in the following descriptions describes a subset of all possible embodiments. However, it may be understood that "some embodiments" may be the same or different subsets of all the possible embodiments, and may be combined with one another without conflicts.

The term "first/second/third" involved in the following descriptions is used only to distinguish between similar objects, and does not represent a specific order of the objects. It may be understood that "first/second/third" may be interchanged to a specific order if allowed to implement the embodiments of this disclosure described herein in an order except the illustrated or described one.

Unless otherwise defined, meanings of technical and scientific terms used in this specification are the same as those usually understood by a person skilled in the art to which this disclosure belongs. The terms used herein are merely for the purpose of describing the embodiments of this disclosure and not intended to limit this disclosure.

Before the embodiments of this disclosure are further described in detail, nouns and terms in the embodiments of this disclosure are described. The nouns and terms in the embodiments of this disclosure are applicable to the following explanations.

(1) Client: an application (APP) running in a terminal for providing various services, for example, a game client, an instant messaging client, or a browser client.

(2) In response to: it is used for representing a condition or status that an operation is performed depending on. When the condition or status that the operation is performed depending on is satisfied, one or more operations may be performed in real time or with a set delay. Unless otherwise stated, there is no limitation on an execution sequence of a plurality of operations that are performed.

(3) Resurrection mechanism: in a virtual scene (for example, a shooting game scene), there is a mechanism capable of resurrecting a player that is killed, generally including in-situ resurrection and remote resurrection. In-situ resurrection means resurrection at a position where the player is killed. Remote resurrection means resurrection at another position at a specific distance from the position where the player is killed.

(4) Virtual scene: it is a virtual scene displayed (or provided) when the APP runs in a terminal. The virtual scene may be a simulated environment of a real world, a semi-simulated semi-fictional virtual environment, or an entirely fictional virtual environment. The virtual scene may be any one of a two-dimensional (2D) virtual scene, a 2.5-dimensional virtual scene, and a three-dimensional (3D) virtual scene. The type of dimension of the virtual scene is not limited in the embodiments of this disclosure. For example, the virtual scene may include the sky, a land, and an ocean. The land may include an environmental element, for example, a desert and a city. A user may control a virtual object to move in the virtual scene.

(5) Virtual object: it includes images of various characters and objects capable of interacting in the virtual scene, or a movable object in the virtual scene. The movable object may be a virtual person, a virtual animal, a cartoon character, or the like, for example, a person, an animal, a plant, an oil barrel, a wall, or a rock that is displayed in the virtual scene. The virtual object may be a virtual image for representing the user in the virtual scene. The virtual scene may include a plurality of virtual objects, and each virtual object has a shape and a volume in the virtual scene, and occupies some space in the virtual scene.

In some embodiments, the virtual object may be a player character controlled through an operation on the client, artificial intelligence (AI) set through training in a battle in the virtual scene, or a non-player character (NPC) set for interaction in the virtual scene. The virtual object may be a virtual person for confrontation interaction in the virtual scene. The number of virtual objects participating in the interaction in the virtual scene may be preset, or may be determined dynamically according to the number of clients joining the interaction.

A shooting game is used here as an example. The user may control the virtual object to fall freely, glide, fall after a parachute is opened, or the like in the sky, or to run, jump, creep, bend forward, or the like in the land, or control the virtual object to swim, float, dive, or the like in the ocean. Certainly, the user may control the virtual object to ride in a vehicle-type virtual prop to move in the virtual scene. For example, the vehicle-type virtual prop may be a virtual automobile, a virtual flight vehicle, or a virtual yacht. Alternatively, the user may control the virtual object to perform confrontation interaction with another virtual object by using an attack-type virtual prop. For example, the virtual prop may be a virtual mobile armor, a virtual tank, or a virtual warplane. The foregoing scenes are merely examples for description herein. This is not specifically limited in the embodiments of this disclosure.

(6) Scene data: it represents various features of the object in the virtual scene during interaction. For example, the scene data may include a position of the object in the virtual scene. Certainly, the scene data may include different types of features according to a type of the virtual scene. For example, in a virtual scene of a game, the scene data may include time for which various functions configured in the virtual scene are required to wait (depending on the number of times that the same function may be used in specific time), or may represent attribute values of various statuses of a game character, for example, a hit point (also referred to as a red value), a magic point (also referred to as a blue value), a status value, or a health point.

Based on the above descriptions about the nouns and terms involved in the embodiments of this disclosure, the following describes a system for controlling an object in a virtual scene in the embodiments of this disclosure. FIG. 1 is a schematic diagram of an architecture of a system 100 for controlling an object in a virtual scene according to an embodiment of this disclosure. Refer to FIG. 1, in order to support an exemplary application, a terminal (for example, a terminal 400-1 and a terminal 400-2 are shown) is connected to a server 200 through a network 300. The network 300 may be a wide area network, a local area network, or a combination thereof. Data transmission is implemented through a wireless or wired link.

The terminal (for example, the terminal 400-1 and the terminal 400-2) is configured to receive a trigger operation of entering a virtual scene based on a view interface, and transmit an obtaining request for scene data of the virtual scene to the server 200.

The server 200 is configured to receive the obtaining request for the scene data, and return the scene data of the virtual scene to the terminal in response to the obtaining request.

The terminal (for example, the terminal 400-1 and the terminal 400-2) is configured to receive the scene data of the virtual scene, and render a picture of the virtual scene based on the scene data to present the picture of the virtual scene on a graphical interface (for example, a graphical interface 410-1 and a graphical interface 410-2 are shown). An object interaction environment, an interaction object, and the like may also be presented in the picture of the virtual scene. Content presented in the picture of the virtual scene is obtained through rendering based on the returned scene data of the virtual scene.

In applications, the server 200 may be an independent physical server, a server cluster or distributed system including a plurality of physical servers, or a cloud server providing a basic cloud computing service, for example, a cloud service, a cloud database, cloud computing, a cloud function, cloud storage, a network service, cloud communication, a middleware service, a domain name service, a security service, a content delivery network (CDN), or a big data and AI platform. The terminal (for example, the terminal 400-1 and the terminal 400-2) may be but is not limited to a smartphone, a tablet computer, a notebook computer, a desktop computer, a smart speaker, a smart television, a smartwatch, or the like. The terminal (for example, the terminal 400-1 and the terminal 400-2) may be directly or indirectly connected to the server 200 through wired or wireless communication. This is not limited herein in this disclosure.

In applications, an APP supporting the virtual scene is installed and run in the terminal (including the terminal 400-1 and the terminal 400-2). The APP may be any one of a first-person shooting (FPS) game, a third-person shooting game, a multiplayer online battle arena game (MOBA), a 2D game APP, a 3D game APP, a virtual reality APP, a 3D map program, and a multiplayer gunfight survival game. Alternatively, the APP may be a standalone APP, for example, a single-player 3D game program.

The virtual scene involved in this disclosure may be used for simulating a 2D virtual space, a 3D virtual space, or the like. An example in which the virtual scene simulates the 3D virtual space is used. The 3D virtual space may be an open space. The virtual scene may be used for simulating an environment in reality. For example, the virtual scene may include the sky, a land, and an ocean. The land may include an environmental element, for example, a desert and a city. Certainly, the virtual scene may further include a virtual item, for example, a virtual building, a virtual vehicle, or a virtual weapon and another prop required by a virtual object in the virtual scene to arm the virtual object or fight with another virtual object. Alternatively, the virtual scene may be used for simulating real environments in different weather, for example, fine weather, wet weather, foggy weather, or a night. The virtual object may be a virtual image for representing a user in the virtual scene. The virtual image may be of any form, for example, a simulated person or a simulated animal. This is not limited in this disclosure. In an implementation, the user may use the terminal (for example, the terminal 400-1) to control the virtual object to carry out an activity in the virtual scene. The activity includes but is not limited to at least one of adjusting a body posture, climbing, walking, running, riding, jumping, driving, picking up, shooting, attacking, and throwing.

An electronic game scene is used as an example. The user may perform an operation on the terminal in advance. After detecting the operation of the user, the terminal may download a game configuration file of an electronic game. The game configuration file may include an APP of the electronic game, interface display data, virtual scene data, or the like. Then, the user may invoke the game configuration file while logging in to the video game on the terminal, to render and display an interface of the electronic game. The user may perform a touch operation on the terminal. After detecting the touch operation, the terminal may determine game data corresponding to the touch operation, and render and display the game data. The game data may include the virtual scene data, behavioral data of a virtual object in the virtual scene, and the like.

In applications, the terminal (including the terminal 400-1 and the terminal 400-2) receives the trigger operation of entering the virtual scene based on the view interface, and transmits the obtaining request for the scene data of the virtual scene to the server 200. The server 200 receives the obtaining request for the scene data, and returns the scene data of the virtual scene to the terminal in response to the obtaining request. The terminal receives the scene data of the virtual scene, and renders the picture of the virtual scene based on the scene data to present the picture of the virtual scene. The virtual object may be displayed in the picture of the virtual scene. The terminal presents, in response to a casting instruction for a copy skill corresponding to the virtual object (that is, a virtual image corresponding to the user logging in to the electronic game) in the virtual scene, a virtual object copy obtained by copying the virtual object, and hides the presented virtual object. The virtual object copy is controlled, in response to an interaction control instruction for the virtual object copy, to perform, in the virtual scene, an interactive operation indicated by the interaction control instruction. Presentation of the virtual object copy is canceled in a case that a disappearing condition of the virtual object copy is satisfied during the interactive operation of the virtual object copy, and the virtual object is presented again, thereby controlling the virtual object to interact in the virtual scene. An interaction attribute of the virtual object that is presented again is consistent with that of the virtual object during casting of the copy skill.

Figure 2:
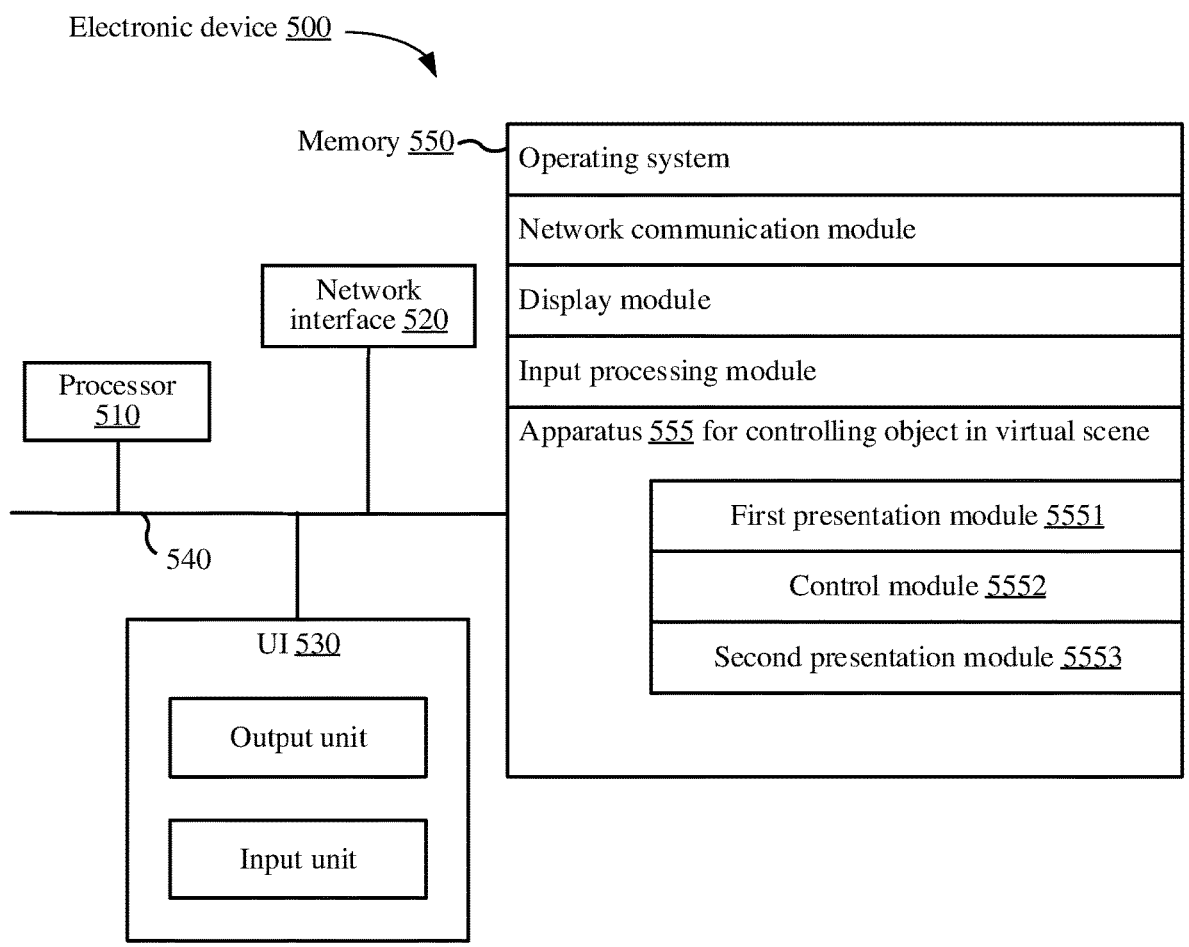
FIG. 2 is a schematic diagram of a structure of an electronic device for implementing a method for controlling an object in a virtual scene according to an embodiment of this disclosure.

FIG. 2 is a schematic diagram of a structure of an electronic device 500 for implementing a method for controlling an object in a virtual scene according to an embodiment of this disclosure. Refer to FIG. 2, in applications, the electronic device 500 may be the server or terminal shown in FIG. 1. An example in which the electronic device 500 is the terminal shown in FIG. 1 is used to describe the electronic device for the method for controlling an object in a virtual scene in an embodiment of this disclosure. The electronic device 500 provided in an embodiment of this disclosure includes at least one processor 510, a memory 550, at least one network interface 520, and a user interface (UI) 530. Components in the electronic device 500 are coupled together through a bus system 540. It may be understood that the bus system 540 is configured to implement connection and communication between the components. In addition to a data bus, the bus system 540 further includes a power bus, a control bus, and a status signal bus. However, for clarity of description, all types of buses in FIG. 2 are marked as the bus system 540.

In some embodiments, an apparatus for controlling an object in a virtual scene in the embodiments of this disclosure may be implemented by using software. FIG. 2 shows an apparatus 555 for controlling an object in a virtual scene in the memory 550. The apparatus may be software in a form of a program, a plug-in, or the like, and includes the following modules: a first presentation module 5551, a control module 5552, and a second presentation module 5553. These modules are logical, and thus may be freely combined or further split according to to-be-realized functions. The following describes the functions of each module.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the terminal or the server may run a computer program to implement the method for controlling an object in a virtual scene in the embodiments of this disclosure. For example, the computer program may be a native program or software module in an operating system, may be a native (APP), that is, a program required to be installed in an operating system to run, for example, a client supporting a virtual scene, like a game APP, may be an applet, that is, a program only required to be downloaded to a browser environment to run, or may be an applet that may be embedded into any APP. In general, the computer program may be any form of APP, module, or plug-in.

Figure 3:
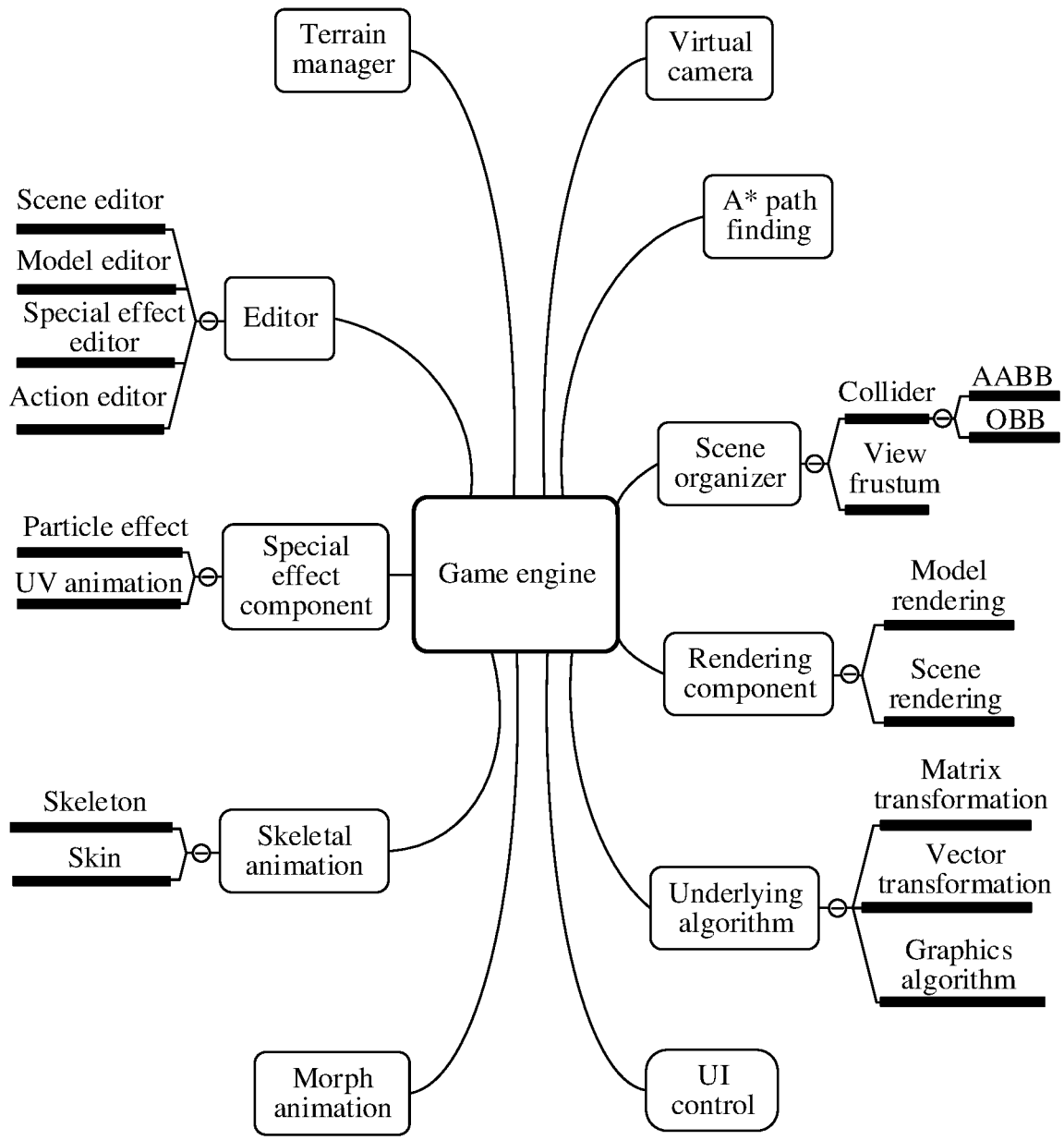
FIG. 3 is a schematic diagram of a principle of a human-computer interaction engine installed in an apparatus for controlling an object in a virtual scene according to an embodiment of this disclosure.

In some embodiments, a human-computer interaction engine configured to implement a method for displaying a picture of a virtual scene is installed in the apparatus 555 for controlling an object in a virtual scene. The human-computer interaction engine includes a functional module, component, or plug-in configured to implement the method for controlling an object in a virtual scene. FIG. 3 is a schematic diagram of a principle of the human-computer interaction engine installed in the apparatus for controlling an object in a virtual scene according to an embodiment of this disclosure. Refer to FIG. 3, an example in which the virtual scene is a game scene is used. Correspondingly, the human-computer interaction engine is a game engine.

The game engine is a code (instruction) set that is designed for a machine running a specific type of game and that may be recognized by the machine, and controls running of the game like an engine. A game program may be divided into two major parts: a game engine and a game resource. The game resource includes an image, a sound, an animation, and the like. Game=engine (program code)+resource (image, sound, animation, and the like). The game engine sequentially invokes these resources as required by a game design.

The method for controlling an object in a virtual scene in the embodiments of this disclosure may be implemented by each module in the apparatus for controlling an object in a virtual scene in FIG. 2 by invoking the related module, component, or plug-in of the game engine shown in FIG. 3. The following uses an example to describe the module, component, or plug-in of the game engine shown in FIG. 3.

As shown in FIG. 3, the following is included. (1) A virtual camera: it is a component required by a picture of the game scene, and is configured to present the picture of the game scene. One game scene corresponds to at least one virtual camera. As actually required, there may be two or more virtual cameras used as game rendering windows for capturing and presenting picture content of a game world for a player. A parameter of the virtual camera may be set to adjust a view of the player in viewing the game world, for example, a first-person view or a third-person view.

(2) Scene organizer: it is used for managing the game scene, for example, collision detection and visibility culling. Collision detection may be implemented by using a collider. As actually required, the collider may be implemented by using an axis-aligned bounding box (AABB) or an oriented bounding box (OBB). Visibility culling may be implemented based on a view frustum. The view frustum is a 3D frame generated according to the virtual camera to crop an object outside a field of view of the camera. An object inside the view frustum is projected to a sight plane, and an object not inside the view frustum is discarded and not processed.

(3) Terrain manager: it is a component for terrain management in the game scene, and is configured to create and edit a game terrain, for example, creating a mountain, a canyon, or a cave in the game scene.

(4) An editor: it is an auxiliary tool in game design, including: a scene editor, configured to edit content of the game scene, for example, changing the terrain, customizing a vegetation distribution, or arranging lighting; a model editor, configured to create and edit a model (a person model in the game scene) in the game; a special effect editor, configured to edit a special effect in the game picture; and an action editor, configured to define and edit an action of a person in the game picture.

(5) A special effect component: it is configured to create and edit a special effect of the game in the game picture, and in applications, may be implemented by using a particle effect and a texture UV animation. The particle effect means combining a plurality of individual particles to present a fixed form, and controlling the particles by using a controller script to move entirely or individually to simulate an effect of water, fire, fog, air, or the like in reality. The UV animation is a texture animation implemented by dynamically modifying a UV coordinate of a map.

(6) A skeletal animation: it is an animation implemented by driving an object by using a built-in skeleton to move.

The skeletal animation may be understood as the following two concepts: the skeleton: an abstract concept for controlling skin, for example, a human skeleton controls skin; and the skin: an element that is controlled by the skeleton and displayed externally, for example, human skin is affected by the skeleton.

(7) A morph animation: that is, a morphing animation, it is an animation implemented by adjusting a vertex of a basic model.

(8) A UI control: it is a control configured to implement displaying of the game picture.

(9) An underlying algorithm: it is an algorithm required to be invoked to realize a function in the game engine, for example, a graphics algorithm required to implement scene organization, or matrix transformation and vector transformation required to implement the skeletal animation.

(10) A rendering component: it is a component required to present the effect of the game picture. The rendering component is used to implement conversion of a scene described with a 3D vector to a scene described with a 2D pixel, including model rendering and scene rendering.

(11) A* path finding: it is an algorithm used for searching for a shortest path during path planning, path finding, and graph traversal in game design.

For example, the UI control in the game engine shown in FIG. 3 may be invoked to implement interaction between the user and the game. The morph animation part in the game engine may be invoked to create a 2D or 3D model. After the model is created, the skeletal animation part may map a material to the model according to different surfaces. In other words, the skeleton is skinned. Finally, the rendering component calculates all effects of the model, the animation, light and shadows, the special effect, and the like in real time, and displays the effects on a human-computer interaction interface. In an embodiment of this disclosure, after the rendering component in the game engine shown in FIG. 3 is invoked to render virtual scene data, the first presentation module 5551 may display a virtual object in the virtual scene on an interface of the virtual scene obtained through rendering. The UI control in the game engine shown in FIG. 3 may further be invoked to receive a casting instruction for a copy skill corresponding to the virtual object in the virtual scene, thereby presenting, in response to the casting instruction, a virtual object copy obtained by copying the virtual object, and hiding the presented virtual object.

The control module 5552 may invoke the UI control in the game engine shown in FIG. 3 to receive an interaction control instruction for the virtual object copy, thereby controlling, in response to the interaction control instruction, the virtual object copy to perform, in the virtual scene, an interactive operation indicated by the interaction control instruction.

The second presentation module 5553 may invoke, during the interactive operation of the virtual object copy, the underlying algorithm part in the game engine shown in FIG. 3 to determine whether a disappearing condition of the virtual object copy is satisfied, and in response to determining that the disappearing condition of the virtual object copy is satisfied, cancel presentation of the virtual object copy, and present the virtual object again, thereby controlling the virtual object to interact in the virtual scene.

Based on the above descriptions about the system for controlling an object in a virtual scene and the electronic device in the embodiments of this disclosure, the following describes the method for controlling an object in a virtual scene in the embodiments of this disclosure. In some embodiments, the method for controlling an object in a virtual scene in the embodiments of this disclosure may be implemented independently by a server or a terminal or collaboratively by a server and a terminal. The following uses implementation by the terminal as an example to describe the method for controlling an object in a virtual scene in the embodiments of this disclosure.

Figure 4:
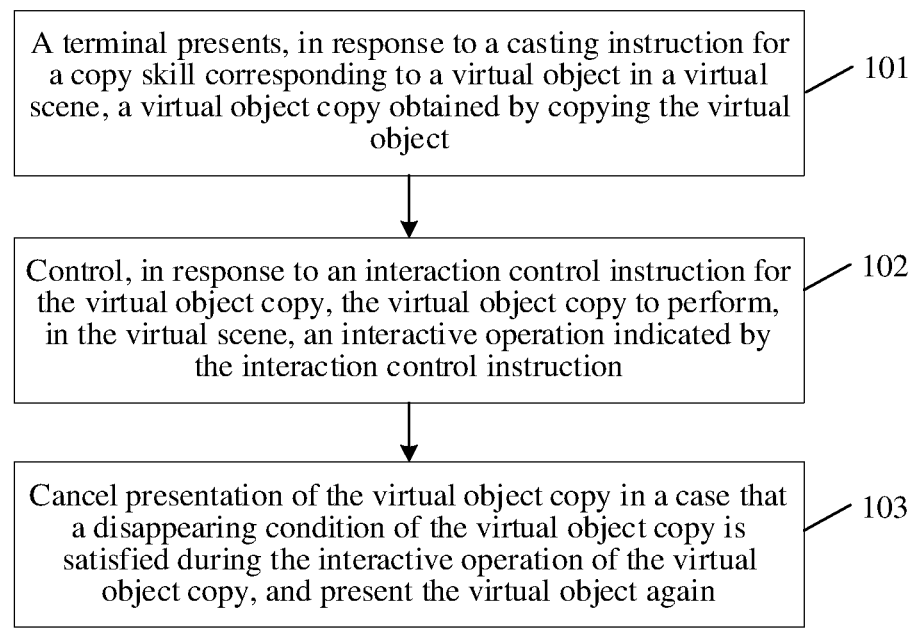
FIG. 4 is a schematic flowchart of a method for controlling an object in a virtual scene according to an embodiment of this disclosure.

FIG. 4 is a schematic flowchart of a method for controlling an object in a virtual scene according to an embodiment of this disclosure. Refer to FIG. 4, the method for controlling an object in a virtual scene in an embodiment of this disclosure includes the followings:

Step 101: The terminal presents, in response to a casting instruction for a copy skill corresponding to a virtual object in a virtual scene, a virtual object copy obtained by copying the virtual object. The casting instruction may be referred to as a second interaction control instruction. The terminal can control, in response to the second interaction control instruction for the copy skill, the virtual object to cast the copy skill. The copy skill includes creating a copy of the virtual object in the virtual scene.

In some embodiments, the copy skill may further include hiding an original version of the virtual object. In some embodiments, the terminal may provide a recommendation of a hiding position for the virtual object to cast the copy skill.

Here, an APP client supporting the virtual scene is installed in the terminal. When a user opens the APP client in the terminal, and the terminal runs the APP client, the terminal presents a picture of the virtual scene (for example, a shooting game scene), and displays the virtual object in the picture of the virtual scene. The virtual scene may be a 2D virtual scene or a 3D virtual scene. The picture of the virtual scene may display the virtual scene from a first-person view (for example, the virtual object in a game is played from a view of a player), display the virtual scene from a third-person view (for example, the player chases the virtual object in a game for gaming), or display the virtual scene from a large bird's-eye view. The foregoing views may be freely switched. In applications, the virtual object is a virtual image corresponding to a current user account in the virtual scene. For example, the virtual object may be a virtual object controlled by the user in the game. Certainly, the virtual scene may further include another virtual object that may be controlled by another user or a controller program. In some embodiments, before step 101, the terminal can control, in response to a first interaction control instruction, the original version of the virtual object to perform an interactive operation indicated by the first interaction control instruction. The first interaction control instruction may be any suitable instruction to control actions of the virtual object (e.g., moving in the virtual scene, handling game items, casting skills, chatting with other virtual objects, etc.) in the virtual scene.

In some embodiments, the first interaction control instruction is directed to the virtual object in a first state. The first state may be an active/living state of the virtual object (e.g., an attribute value of the virtual object such as a health point is above a preset threshold). In some embodiments, the second control instruction may be unavailable when the virtual object is in the first state and become available in response to the virtual object being in a second state. The second state may be an inactive/death state (e.g., the attribute value of the virtual object such as a health point equals or is below the preset threshold).

In some embodiments, the terminal can enable the copy skill for the virtual object in response to a corresponding virtual prop being carried by the virtual object.

An example in which the virtual scene is displayed from the first-person view is used. Displaying the virtual scene on a human-computer interaction interface may include determining a field of view region of the virtual object according to a viewing position and field of view of the virtual object in a complete virtual scene, and presenting a partial virtual scene in the field of view region in the complete virtual scene. That is, the displayed virtual scene may be the partial virtual scene relative to the complete virtual scene. The first-person view is a viewing angle at which the user is shocked most, so that immersive perception of the user may be implemented in an operation process.

An example in which the virtual scene is displayed from the large bird's-eye view is used. Presenting the picture of the virtual scene on a human-computer interaction interface may include presenting, in response to a scaling operation on a complete virtual scene, a partial virtual scene corresponding to the scaling operation on the human-computer interaction interface. That is, the displayed virtual scene may be the partial virtual scene relative to the complete virtual scene. In this way, operability in an operation process of the user can be improved, thereby improving human-computer interaction efficiency.

Here, in the virtual scene, the user may trigger an interaction control instruction for the virtual object by using the human-computer interaction interface, to control the virtual object to perform an interactive operation. For example, the virtual object may hold at least one virtual prop or be fitted with at least one virtual skill (or capability) or the like. The virtual prop may be any prop used by the virtual object during interaction, for example, a virtual shooting prop, a virtual bow and arrow, a virtual slingshot, a virtual nunchakus, or a virtual ship. The virtual skill may be a protection skill, an attack skill, or the like. The user may control the virtual object based on the virtual prop or virtual skill the virtual object is fitted with, to perform the interactive operation in the virtual scene.

In an embodiment of this disclosure, the copy skill is provided for the virtual object in the virtual scene. When the casting instruction for the copy skill corresponding to the virtual object in the virtual scene is received, a copy of the virtual object is created to obtain the copy of the virtual object (also called the virtual object copy) in response to the casting instruction, such that the user controls the virtual object copy to interact in the virtual scene. The virtual object copy is obtained by copying the virtual object. The virtual object copy and the virtual object may be completely the same in various aspects (for example, interaction attribute). In addition, the terminal may further hide the presented virtual object in the virtual scene, such that the user is not required to consider whether the original version of the virtual object may be attacked by another virtual object while controlling the copy of the virtual object, improving a sense of control of the user on the virtual object in the virtual scene. In applications, an interaction attribute (for example, a health point, virtual equipment or virtual prop the virtual object copy is fitted with, a defense value, or a posture at which a virtual gun is held) of the virtual object copy obtained by copying the virtual object may be completely consistent with that of the virtual object.

In some embodiments, the terminal may receive the casting instruction for the copy skill corresponding to the virtual object in the following manner: presenting a skill control corresponding to the copy skill; and receiving, in response to a trigger operation on the skill control in a case that the skill control is in an active state, the casting instruction for the copy skill corresponding to the virtual object.

Here, the corresponding skill control is set for the copy skill. When the skill control is in the active state, the user may trigger the skill control by using the trigger operation, for example, tapping, to control the virtual object to cast the copy skill. When the skill control is in the active state, the terminal receives the trigger operation on the skill control, and receives, in response to the trigger operation, the casting instruction for the copy skill corresponding to the virtual object.

Figure 5:
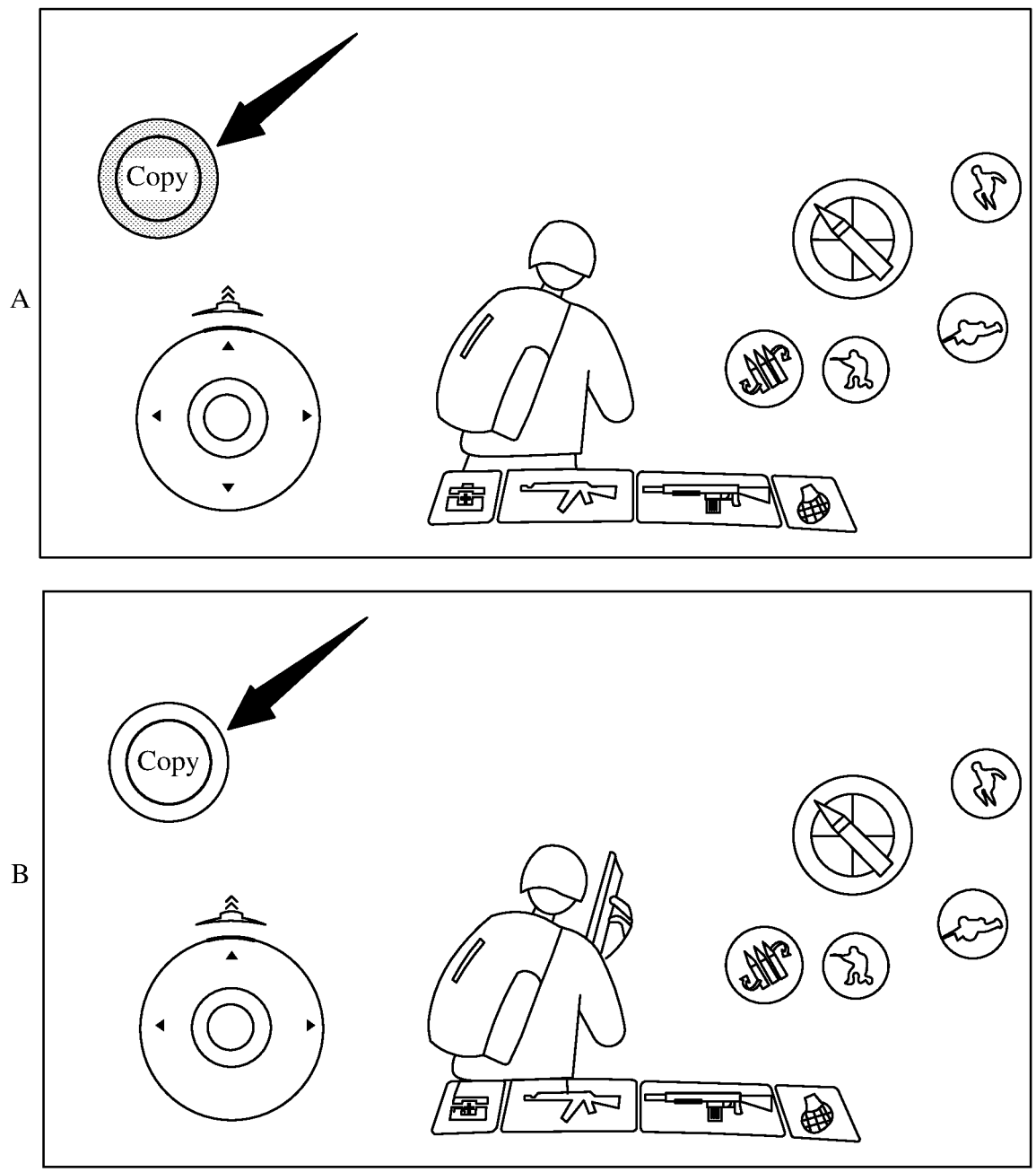
FIG. 5 is a schematic diagram of displaying a skill control according to an embodiment of this disclosure.

In applications, display modes of the skill control in the active state and in an inactive state may be different. For example, the skill control in the active state may be highlighted, and the skill control in the inactive state may be grayed. Alternatively, the skill control in the active state and the skill control in the inactive state are displayed by using different identifiers. FIG. 5 is a schematic diagram of displaying the skill control according to an embodiment of this disclosure. Here, A in FIG. 5 shows the skill control "Copy" in the inactive state, which is grayed. B in FIG. 5 shows the skill control "Copy" in the active state, which is displayed in a manner other than graying. In this case, the casting instruction for the copy skill corresponding to the virtual object is received in response to the trigger operation on the skill control.

In some embodiments, the terminal may present the skill control corresponding to the copy skill in the following manner: presenting the skill control that corresponds to the copy skill and that is in a cooldown state. Correspondingly, the terminal may control the skill control to be in the active state in the following manner: obtaining a cooldown time interval and a cooldown starting time point of the skill control; and controlling, in response to determining based on the cooldown time interval and the cooldown starting time point that a cooldown ending time point of the skill control is reached, the skill control to be switched from the cooldown state to the active state.

Here, the skill control corresponding to the copy skill has the cooldown state. The skill control in the cooldown state is the skill control in the inactive state. In this case, the skill control is unavailable. Correspondingly, the terminal may control the skill control to be switched from the cooldown state to the active state in the following manner.

In an embodiment of this disclosure, the cooldown time interval corresponding to the cooldown state is set for the skill control. The terminal obtains the cooldown time interval and the cooldown starting time point (that is, a starting time point of the cooldown state of the skill control) of the skill control, and controls, in response to determining based on the cooldown time interval and the cooldown starting time point that the cooldown ending time point (that is, an ending time point of the cooldown state of the skill control) of the skill control is reached, the skill control to be switched from the cooldown state to the active state. In this way, the copy skill is implemented by using the skill control with the cooldown state and the active state, so that the copy skill correspondingly has the cooldown state and the active state. This makes it more interesting for the user to control the virtual object to cast the copy skill, and improves experience of the user in the virtual scene. In addition, the cooldown time interval of the cooldown state of the skill control is set, so that the skill control may be automatically switched between the cooldown state and the active state as time changes without manual control. This reduces human-computer interaction operations, and improves human-computer interaction efficiency.

In some embodiments, the terminal may control the skill control to be in the active state in the following manner: obtaining an interaction result obtained by controlling the virtual object to interact in the virtual scene; and controlling, in response to determining based on the interaction result that an activation condition of the skill control is satisfied, the skill control to be in the active state.

Here, the skill control corresponding to the copy skill has a cooldown state. The skill control in the cooldown state is the skill control in an inactive state. In this case, the skill control is unavailable. Correspondingly, the terminal may control the skill control to be switched from the cooldown state to the active state in the following manner.

In an embodiment of this disclosure, the active state of the skill control may be triggered by using the interaction result of interaction of the virtual object in the virtual scene. Here, the terminal obtains the interaction result obtained by controlling the virtual object to interact in the virtual scene, for example, an interaction point, the number of other virtual objects killed by the virtual object, and killing a target virtual object (for example, a virtual monster). The skill control is controlled to be in the active state in response to determining based on the interaction result that an activation condition of the skill control is satisfied. In applications, the activation condition may be whether the interaction result reaches an interaction result threshold (for example, if the interaction point reaches a point threshold or the quantity of other virtual objects killed by the virtual object reaches the number threshold, it indicates that the activation condition is satisfied), whether the interaction result represents that the target virtual object is killed (for example, if the interaction result represents that a virtual monster 1 is killed, it indicates that the activation condition is satisfied), or the like. In this way, the copy skill is implemented by using the skill control with the cooldown state and the active state, so that the copy skill correspondingly has the cooldown state and the active state. This makes it more interesting for the user to control the virtual object to cast the copy skill, and improves experience of the user in the virtual scene. In addition, whether the skill control corresponding to the copy skill is in the active state is controlled according to the interaction result obtained by the user by controlling the virtual object to interact in the virtual scene. This can stimulate enthusiasm of the user in interaction in the virtual scene and improve interestingness of interaction and stickiness of the user.

In some embodiments, the terminal may receive the casting instruction for the copy skill corresponding to the virtual object in the following manner: presenting a virtual prop corresponding to the copy skill in a picture of the virtual scene; and receiving, in a case that the virtual object is successfully fitted with the virtual prop, the casting instruction for the copy skill corresponding to the virtual object.

Here, the virtual object may be controlled to be fitted with the virtual prop with the copy skill to control the virtual object to cast the copy skill. In applications, the virtual prop may be obtained when the virtual object is controlled to interact in the virtual scene (for example, found during interaction in a case that the interaction result satisfies an obtaining condition of the virtual prop), or may be obtained before the virtual object is controlled to enter the virtual scene (for example, before the game is started). The terminal presents the virtual prop corresponding to the copy skill in the picture of the virtual scene. When the virtual object is successfully fitted with the virtual prop, the casting instruction for the copy skill corresponding to the virtual object is received.

In some embodiments, the terminal may control the virtual object to be fitted with the virtual prop in the following manner: presenting, in a case that the virtual object is within a sensing range of the virtual prop, a fitting function item corresponding to the virtual prop; and controlling, in response to a trigger operation on the fitting function item, the virtual object to be fitted with the virtual prop.

Here, the virtual prop may be obtained when the virtual object is controlled to interact in the virtual scene. That is, the terminal presents, in the case that the virtual object is within the sensing range of the virtual prop, a fitting function item corresponding to the virtual prop in a process of controlling the virtual object to interact. The sensing range of the virtual prop may be a target region centered about the virtual prop, for example, a circular region that takes the virtual prop as a circle center and a target length as a radius. The user may fit the virtual object with the corresponding virtual prop by using the fitting function item. When receiving the trigger operation on the fitting function item, the terminal controls, in response to the trigger operation, the virtual object to be fitted with the virtual prop. In this way, the user may achieve the purpose of casting the copy skill by fitting with the virtual prop. This enriches manners for obtaining the copy skill, and improves diversity of skill casting manners in the virtual scene.

Figure 6:
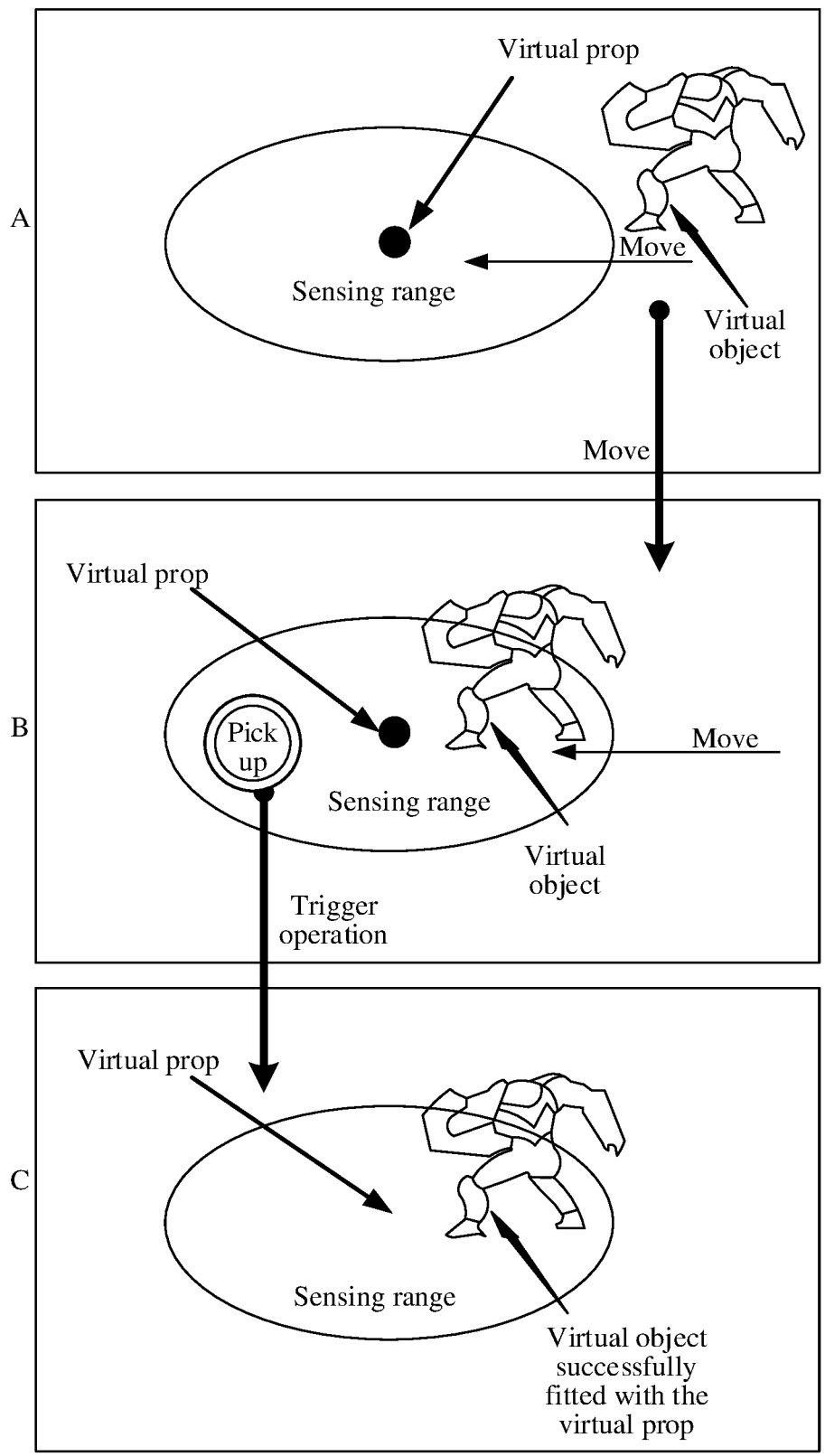
FIG. 6 is a schematic flowchart of fitting with a virtual prop according to an embodiment of this disclosure.

FIG. 6 is a schematic flowchart of fitting with the virtual prop according to an embodiment of this disclosure. Here, for example, as shown in A in FIG. 6, a virtual prop "Copy" and a sensing range of the virtual prop are presented. In this case, the virtual object is outside the sensing range. As shown in B in FIG. 6, the terminal controls the virtual object to be within the sensing range, and in addition, presents a fitting function item "Pick up" corresponding to the virtual prop "Copy". As shown in C in FIG. 6, in response to the trigger operation on the fitting function item "Pick up", the virtual object is controlled to be fitted with the virtual prop "Copy", and in addition, the virtual prop "Copy" the virtual object is successfully fitted with is no longer displayed.

In some embodiments, the terminal may trigger a response to the casting instruction for the copy skill corresponding to the virtual object in the following manner: receiving the casting instruction, and obtaining a casting count of the copy skill; and triggering the response to the casting instruction in a case that the casting count does not reach a count threshold.

Here, the count threshold of the casting count of the copy skill may be set. The count threshold of the casting count may be for each interaction battle in the virtual scene. When receiving the casting instruction for the copy skill corresponding to the virtual object, the terminal obtains the casting count of the current copy skill. When the casting count does not reach the count threshold, it indicates that the copy skill may still be cast. In this case, the response to the casting instruction is triggered to control the virtual object to cast the copy skill. When the casting count reaches the count threshold, it indicates that the copy skill cannot be cast any more. In this case, no response is made to the casting instruction, and in addition, corresponding prompt information may be displayed to prompt the user that the casting count of the copy skill has reached the count threshold and the copy skill cannot be cast any more. In this way, an additional limit is made to the casting count of the copy skill to restrict the user from casting the copy skill infinitely in the virtual scene. Therefore, the user may be stimulated to look for a strategy for casting the copy skill, and immersion and experience of the user in the virtual scene may be improved.

In some embodiments, when the virtual object is within a sensing range of a target hiding position, the terminal may present position recommendation information corresponding to the target hiding position. The position recommendation information is used for indicating a recommendation degree of controlling the virtual object to cast the copy skill at the target hiding position.

Here, when the virtual object is within the sensing range of the target hiding position, the terminal may present the position recommendation information corresponding to the target hiding position, so as to indicate, to the user by using the position recommendation information, the recommendation degree of controlling the virtual object to cast the copy skill at the target hiding position. For example, the position recommendation information may be "Here you can hide and cast the copy skill". In applications, the sensing range of the target hiding position may be a target region centered about the virtual prop, for example, a circular region that takes the virtual prop as a circle center and a target length as a radius. When the user controls the virtual object to be at the target hiding position, the terminal may hide the presented virtual object, such that another user in the virtual scene (for example, another player in a game scene) cannot see the virtual object. That is, the target hiding position may be used for the user to control the virtual object to hidden relative to the another user. Therefore, the user is prevented from being interrupted by another virtual object or attacked by another virtual object when controlling the virtual object to cast the copy skill and when controlling the virtual object copy to interact after casting the copy skill, and experience of the user in using the copy skill is improved.

Figure 7:
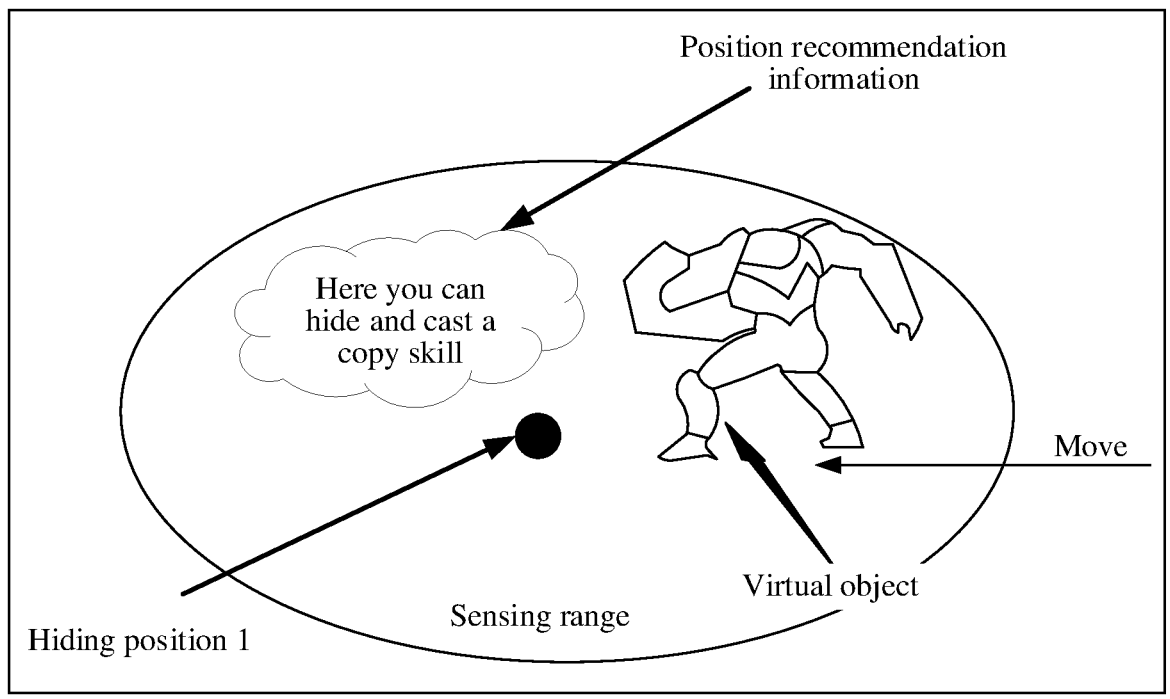
FIG. 7 is a schematic diagram of displaying position recommendation information according to an embodiment of this disclosure.

FIG. 7 is a schematic diagram of displaying the position recommendation information according to an embodiment of this disclosure. Here, for example, when the virtual object is within a sensing range of a "hiding position 1", the position recommendation information "Here you can hide and cast the copy skill" corresponding to the "hiding position 1" is presented in the picture of the virtual scene.

Step 102: Control, in response to the interaction control instruction for the virtual object copy, the virtual object copy to perform, in the virtual scene, the interactive operation indicated by the interaction control instruction. The interaction control instruction for the virtual object copy may be referred as a third interaction control instruction for the copy. In some embodiments, the third interaction control instruction for the copy of the virtual object may be any suitable instruction to control actions of the copy of the virtual object (e.g., moving in the virtual scene, handling game items, casting skills, chatting with other virtual objects, etc.) in the virtual scene. In one embodiment, the copy is controlled under a first-person perspective. In another embodiment, the copy is controlled under a third-person perspective.

In some embodiments, while the copy of the virtual object is controlled, the terminal may further display information associated with the virtual object (i.e., original version of the virtual object). For example, the information includes a risk determined within a region centered at the virtual object. The risk may be evaluated based on an environment of the region, such as other virtual object(s) and/or props located in the region.

Here, after receiving the casting instruction for the copy skill corresponding to the virtual object, the terminal copies, in response to the casting instruction, the virtual object to obtain the virtual object copy, presents the virtual object copy obtained by copying the virtual object, and hides the presented virtual object. In this case, a virtual character that may be controlled by the user is switched from the virtual object to the virtual object copy, and the user may trigger the interaction control instruction for the virtual object copy to control the virtual object copy to perform the interactive operation. The terminal controls, in response to the interaction control instruction for the virtual object copy, the virtual object copy to perform the corresponding interactive operation in the virtual scene.

In applications, the interaction control instruction may be an instruction for controlling the virtual object copy to move, shoot, aim, or the like. In this case, the terminal controls, in response to the interaction control instruction, the virtual object copy to perform the interactive operation of moving, shooting, aiming, or the like in the virtual scene.

Step 103: Cancel presentation of the virtual object copy in a case that a disappearing condition of the virtual object copy is satisfied during the interactive operation of the virtual object copy, and present the virtual object again. In other words, the copy of the virtual object is removed from the virtual scene in response to that the disappearing condition of the copy is satisfied. In addition, the virtual object is controlled, in response to a fourth interaction control instruction, to perform an interactive operation indicated by the fourth interaction control instruction. The fourth interaction control instruction may refer to a interaction control instruction for the original version of the virtual object after the copy of the virtual object is removed and the original version of the virtual object is presented.

In some embodiments, the virtual object maintains a same state before and after the controlling the copy to perform an interactive operation indicated by the third interaction control instruction. In one example, the same state comprises at least one of: a health state, a skill state, and an equipment state. In another example, the same state comprises a position state in the virtual scene.

In some embodiments, the disappearing condition comprises at least one of: the copy being eliminated from the virtual scene; or receiving an ending instruction for the copy skill.

In some embodiments, the disappearing condition is a duration for the copy is over.

The interaction attribute of the virtual object that is presented again is consistent with that of the virtual object during casting of the copy skill.

Here, there is the disappearing condition corresponding to the virtual object copy. When the disappearing condition is satisfied, the virtual object copy may disappear, and then the virtual character that may be controlled by the user is switched from the virtual object copy to the virtual object. Therefore, when the virtual object copy disappears, control over the virtual object may be implemented quickly, to continue to control the virtual object to interact in the virtual scene.

When controlling the virtual object copy to perform the interactive operation in the virtual scene, the terminal may determine in real time or periodically whether the disappearing condition of the virtual object copy is satisfied. When it is determined that the disappearing condition of the virtual object copy is satisfied, presentation of the virtual object copy is canceled, and in addition, the virtual character that may be controlled by the user is switched from the virtual object copy to the virtual object. In this case, the terminal presents the virtual object again, and the user may control the virtual object to interact in the virtual scene. In an embodiment of this disclosure, the interaction attribute of the virtual object that is presented again is consistent with that of the virtual object during casting of the copy skill. The interaction attribute may include a status (for example, the health point, the defense value, a hit pointer, or an attack value), virtual equipment (for example, a virtual gun or a virtual bomb), a virtual skill, a posture (for example, a posture at which a virtual shooting prop is held), and the like of the virtual object.

In some embodiments, the terminal may determine that the disappearing condition of the virtual object copy is satisfied in the following manner: presenting a status attribute value of the virtual object copy during the interactive operation of the virtual object copy; and determining, in a case that the status attribute value is less than a status threshold or returns to zero, that the disappearing condition of the virtual object copy is satisfied.

Here, the disappearing condition of the virtual object copy is whether the status attribute value of the virtual object copy is less than the status threshold or returns to zero. When the status attribute value is less than the status threshold or returns to zero, the disappearing condition of the virtual object copy is satisfied. In applications, the status attribute value of the virtual object copy may be obtained when the virtual object copy is controlled to perform the interactive operation. When the obtained status attribute value is less than the status threshold or returns to zero, it is determined that the disappearing condition of the virtual object copy is satisfied. The status attribute value may be used for representing the health point, the hit point, or the like of the virtual object.

In an embodiment of this disclosure, a status attribute value of the virtual object copy may alternatively be presented during the interactive operation of the virtual object copy. For example, the status attribute value is presented in the picture of the virtual scene. When the presented status attribute value is less than a status threshold or returns to zero, it is determined that the disappearing condition of the virtual object copy is satisfied, and presentation of the virtual object copy is canceled.

Figure 8:
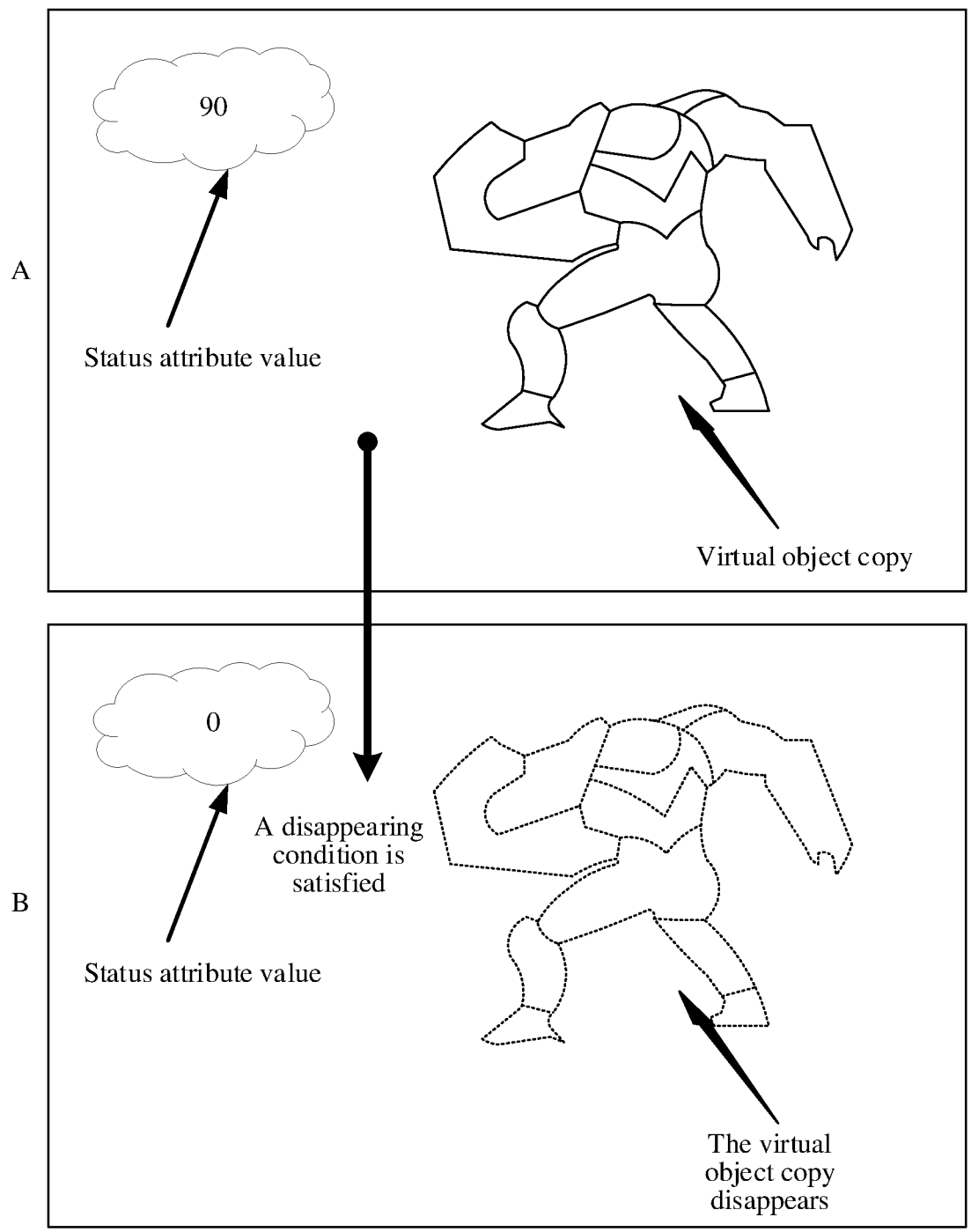
FIG. 8 is a schematic diagram of displaying a status attribute value according to an embodiment of this disclosure.

FIG. 8 is a schematic diagram of displaying the status attribute value according to an embodiment of this disclosure. For example, as shown in A in FIG. 8, the virtual object copy that is performing the interactive operation is presented in the picture of the virtual scene, and a status attribute value "90" of the virtual object copy is presented. As shown in B in FIG. 8, when the status attribute value of the virtual object copy returns to zero, it is determined that the disappearing condition of the virtual object copy is satisfied, and presentation of the virtual object copy is canceled.

In some embodiments, the terminal may determine that the disappearing condition of the virtual object copy is satisfied in the following manner: presenting remaining display duration of the virtual object copy during the interactive operation of the virtual object copy; and determining, in a case that the remaining display duration is less than a duration threshold or returns to zero, that the disappearing condition of the virtual object copy is satisfied.

Here, the disappearing condition of the virtual object copy is whether the remaining display duration of the virtual object copy is less than the duration threshold or returns to zero. When the remaining display duration is less than the duration threshold or returns to zero, the disappearing condition of the virtual object copy is satisfied. In applications, the remaining display duration of the virtual object copy may be obtained when the virtual object copy is controlled to perform the interactive operation. When the obtained remaining display duration is less than the duration threshold or returns to zero, it is determined that the disappearing condition of the virtual object copy is satisfied. In actual implementation, the target display duration of the virtual object copy may be set. The remaining display duration may be determined according to the set target display duration and current display duration. That is, a difference between the target display duration and the current display duration is determined as the remaining display duration.

In an embodiment of this disclosure, remaining display duration of the virtual object copy may alternatively be presented during the interactive operation of the virtual object copy. For example, the remaining display duration is presented in the picture of the virtual scene. When the presented remaining display duration is less than a duration threshold or returns to zero, it is determined that the disappearing condition of the virtual object copy is satisfied, and presentation of the virtual object copy is canceled.

Figure 9:
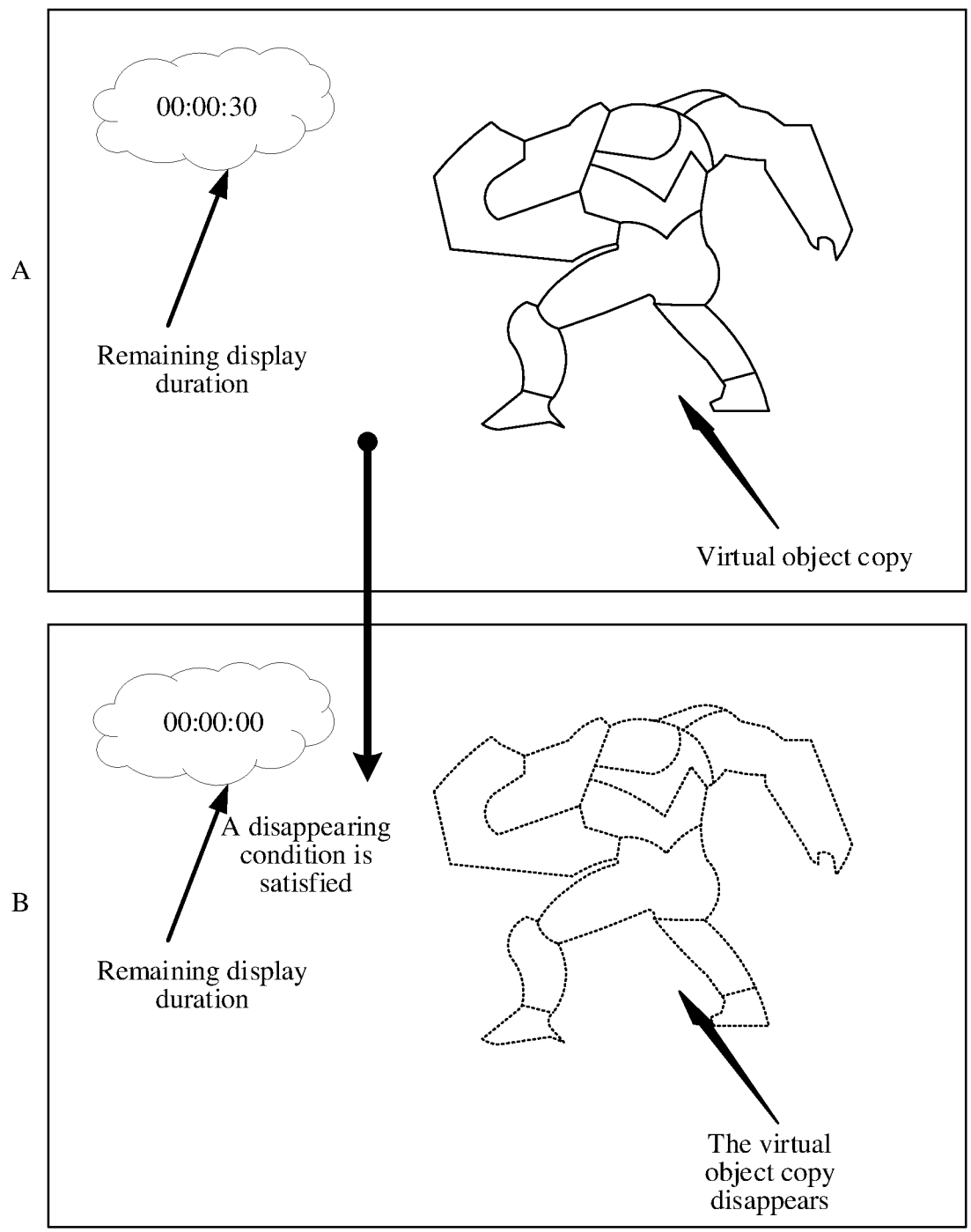
FIG. 9 is a schematic diagram of displaying remaining display duration according to an embodiment of this disclosure.

FIG. 9 is a schematic diagram of displaying the remaining display duration according to an embodiment of this disclosure. For example, as shown in A in FIG. 9, the virtual object copy that is performing the interactive operation is presented in the picture of the virtual scene, and remaining display duration "00:00:30" of the virtual object copy is presented. As shown in B in FIG. 9, when the remaining display duration of the virtual object copy returns to zero, it is determined that the disappearing condition of the virtual object copy is satisfied, and presentation of the virtual object copy is canceled.

In some embodiments, the terminal may determine that the disappearing condition of the virtual object copy is satisfied in the following manner: obtaining a status attribute value and display duration of the virtual object copy during the interactive operation of the virtual object copy; and determining, in a case that at least one of the following is satisfied, that the disappearing condition of the virtual object copy is satisfied: the status attribute value is less than a status threshold, and the display duration reaches target display duration.

Here, the disappearing condition of the virtual object copy is that at least one of the following is satisfied: the status attribute value is less than the status threshold, and the display duration reaches the target display duration. When at least one of the conditions is satisfied, it is determined that the disappearing condition of the virtual object copy is satisfied, and presentation of the virtual object copy is canceled.

In applications, the status attribute value of the virtual object copy and the display duration of the virtual object copy may be obtained during the interactive operation of the virtual object copy. When at least one of the conditions that the status attribute value is less than the status threshold and that the display duration reaches the target display duration is satisfied, it is determined that the disappearing condition of the virtual object copy is satisfied. In this case, presentation of the virtual object copy is canceled. That is, when the status attribute value is less than the status threshold, but the display duration does not reach the target display duration, it is determined that the disappearing condition of the virtual object copy is satisfied, and presentation of the virtual object copy is canceled. Alternatively, when the status attribute value is not less than the status threshold, but the display duration reaches the target display duration, it is determined that the disappearing condition of the virtual object copy is satisfied, and presentation of the virtual object copy is canceled. Alternatively, when the status attribute value is less than the status threshold, and the display duration reaches the target display duration, it is determined that the disappearing condition of the virtual object copy is satisfied, and presentation of the virtual object copy is canceled.

With application of the foregoing embodiments, different disappearing conditions are set, so that the virtual object copy may be controlled to disappear in a more diversified manner. Therefore, diversity of experience in the copy skill in the virtual scene is improved.

In some embodiments, the terminal may determine the target display duration in the following manner: obtaining an interaction level of the virtual object; determining, based on a correspondence between an interaction level and copy display duration, target copy display duration corresponding to the interaction level of the virtual object; and determining the target copy display duration as the target display duration.

Here, the target display duration may be determined in the following manner. A correspondence between an interaction level of a virtual object and copy display duration may be preset. For example, if an interaction level is a first level, copy display duration is 20 s. If an interaction level is a second level, copy display duration is 25 s. The interaction level may be an object level (for example, which may be determined based on the interaction result of the virtual object) of the virtual object, or may be an account level (for example, which may be determined based on the interaction result, interaction duration, or the like of the user in the virtual scene) of the user account corresponding to the virtual object. When determining the target display duration of the virtual object copy, the terminal is required to first obtain the interaction level of the virtual object, and then determine, based on the correspondence between an interaction level and copy display duration, the target copy display duration corresponding to the interaction level of the virtual object, thereby determining the target copy display duration as the target display duration. Therefore, different virtual objects may correspond to different copy display duration, and the user may prolong display duration of the virtual object copy by improving the interaction level of the virtual object. This improves the enthusiasm of the user in participating in interaction in the virtual scene.

In some embodiments, the terminal may present status indication information of the hidden virtual object during the interactive operation of the virtual object copy. The status indication information is used for indicating real-time scene information in a sensing region centered about the virtual object.

In applications, the hidden virtual object may also be attacked by another virtual object. For example, another object may be fitted with a virtual prop or a virtual skill, and thus is able to discover the hidden virtual object. Because the user controlling the virtual object is controlling the virtual object copy to interact, that is, is unable to control the virtual object, the virtual object may be attacked and cannot fight back. Therefore, in an embodiment of this disclosure, the terminal may further present status indication information of the hidden virtual object when controlling the virtual object copy to perform the interactive operation, for example, displaying in a form of a sub-picture or a floating window. The status indication information is used for indicating the real-time scene information in the sensing region centered about the virtual object, for example, whether there is another virtual object in the sensing region, or the number, positions, or the like of other virtual objects. The status indication information may further be used for indicating a status attribute value of the virtual object, for example, a hit point or a health point. By using the status indication information, the user may further know about a situation of the virtual object in real time when controlling the virtual object copy to interact, such that the user responds when the virtual object has a problem (for example, is attacked by another virtual object).

Figure 10:
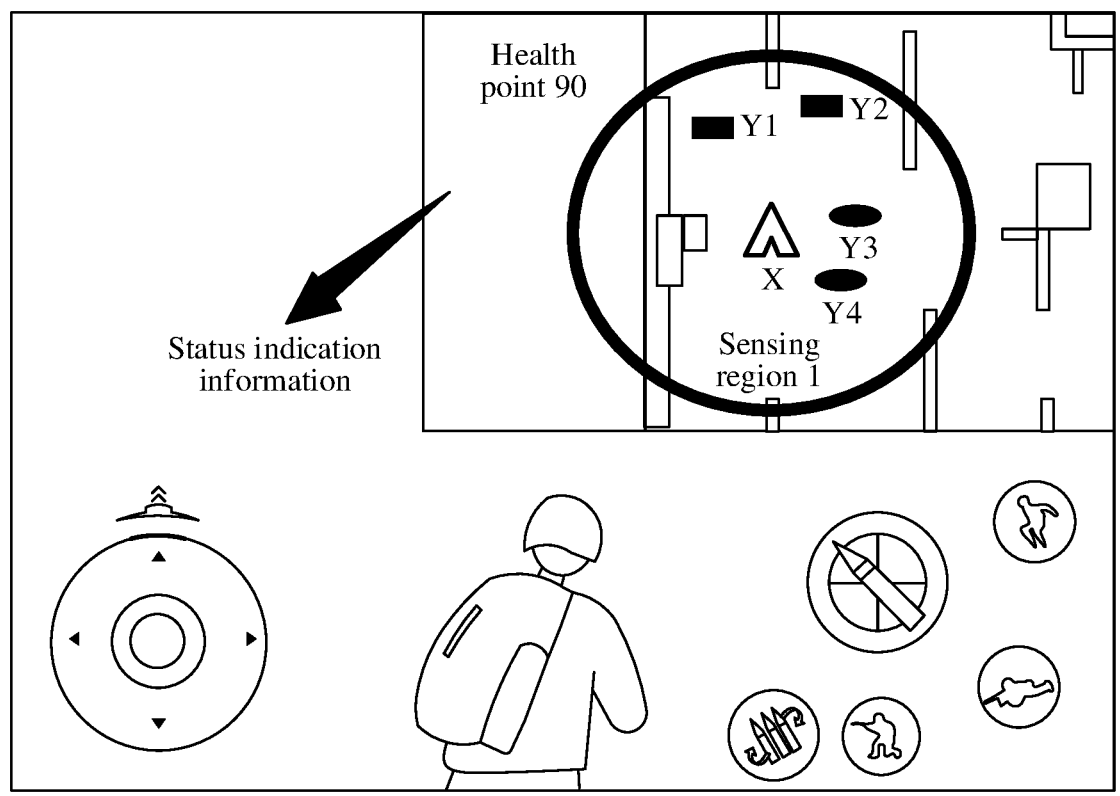
FIG. 10 is a schematic diagram of displaying status indication information according to an embodiment of this disclosure.

FIG. 10 is a schematic diagram of displaying the status indication information according to an embodiment of this disclosure. Here, for example, the terminal displays the status indication information of the virtual object by using a sub-picture in the picture of the virtual scene. The status indication information is used for indicating the real-time scene information in the sensing region centered about the virtual object (that is, X), including other virtual objects Y1, Y2, Y3, and Y4 within the sensing region. It may be determined according to displaying that the quantity of the other virtual objects is 4, which are at front-left (Y1), front-right (Y2), right (Y3), and rear-right (Y4) positions. The status indication information further includes the status attribute value of the virtual object, that is, the health point is 90. In this way, when the user controls the virtual object copy to interact, the real-time scene information corresponding to the virtual object is displayed in real time by using the status indication information, such that the user may timely know about the situation of the virtual object, and adjust an interaction strategy according to the situation of the virtual object. Therefore, user experience is improved. In addition, utilization of a display resource is improved. The user may know about a situation around the virtual object without operating the virtual object copy to return to a position of the virtual object. Therefore, the human-computer interaction efficiency and resource utilization of a device are improved.

In some embodiments, the terminal may determine that the disappearing condition of the virtual object copy is satisfied in the following manner: presenting, in a case that the status indication information indicates that there is an interaction risk for the virtual object, an ending function item corresponding to the virtual object copy; and determining, in response to receiving a trigger operation on the ending function item, that the disappearing condition of the virtual object copy is satisfied.

Here, when the status indication information indicates that there is the interaction risk for the virtual object (for example, the virtual object may be attacked by another virtual object, or has been attacked by another virtual object), the ending function item corresponding to the virtual object copy is presented, and the user may quickly switch the virtual character that may be controlled by the user from the virtual object copy to the virtual object by using the ending function item. In this case, when receiving the trigger operation on the ending function item, the terminal determines, in response to the trigger operation, that the disappearing condition of the virtual object copy is satisfied, and cancels presentation of the virtual object copy, to quickly switch the virtual character that may be controlled by the user from the virtual object copy to the virtual object. Therefore, the user may control the virtual object to respond to the interaction risk, for example, avoid an attack of the another virtual object or perform an operation of fighting back or the like.

In some embodiments, in a case that the copy skill is cast, the virtual object is at a first position in the virtual scene, and a position at which the virtual object copy disappears is different from the first position. The terminal may present the virtual object again in the following manner: presenting the virtual object again at the first position.

Here, the virtual object casts the copy skill at the first position in the virtual scene. The position at which the virtual object copy disappears is different from the first position. When the terminal cancels presentation of the virtual object copy, the terminal presents the virtual object again at the first position. In this way, when the virtual object copy disappears, the terminal quickly switches the virtual character that may be controlled from the virtual object copy to the virtual object, and the virtual object retains the interaction attribute during casting of the copy skill. This makes remote resurrection (at a position at which the virtual object casts the copy skill) of the virtual object possible, and provides larger operation space for the user.

In some embodiments, the virtual object copy disappears at a second position in the virtual scene. The terminal may present the virtual object again in the following manner: presenting the virtual object again at a third position in the virtual scene. The third position is a position whose distance from the second position exceeds a distance threshold in the virtual scene.

Here, the terminal controls the virtual object copy to disappear at the second position in the virtual scene. In addition, the terminal may present the virtual object again at the third position in the virtual scene. The third position is a position whose distance from the second position exceeds the distance threshold in the virtual scene, and may be determined at random. In this way, when the virtual object copy disappears, the terminal quickly switches the virtual character that may be controlled from the virtual object copy to the virtual object, and the virtual object retains the interaction attribute during casting of the copy skill. This makes remote resurrection of the virtual object possible. The distance between the third position and the position at which the virtual object copy disappears exceeds the distance threshold. If the position at which the virtual object copy disappears is an object interaction center (for example, a place where the game character fights), the virtual object may be prevented from being attacked or disturbed by another virtual object during resurrection, and larger operation space is provided for the user.

With application of the foregoing embodiments, when the casting instruction for the copy skill corresponding to the virtual object in the virtual scene is received, the virtual object copy obtained by copying the virtual object is presented, and the presented virtual object is hidden. The virtual object copy may be controlled by triggering the interaction control instruction for the virtual object copy, to perform, in the virtual scene, the interactive operation indicated by the interaction control instruction. If the disappearing condition of the virtual object copy is satisfied during the interactive operation of the virtual object copy, presentation of the virtual object copy is canceled to make the virtual object copy disappear, and the virtual object is presented again, thereby continuing to control the virtual object to interact in the virtual scene.

Here, (1) the virtual object is copied by using the copy skill to obtain the virtual object copy, and a user may control the virtual object copy to interact in the virtual scene. When the disappearing condition of the virtual object copy is satisfied, the virtual object copy is controlled to disappear, the virtual object is presented again, and the user may continue to control the virtual object to interact in the virtual scene. Therefore, an entire process includes disappearance of the virtual object (specifically disappearance of the virtual object copy) and presenting the virtual object again. In other words, disappearance and resurrection of the virtual object are implemented. (2) The interaction attribute of the virtual object that is presented again is consistent with that of the virtual object during casting of the copy skill. Therefore, the interaction attribute of the virtual object during casting of the copy skill is retained, and is not required to be resumed through a manual operation from an initial state. This reduces processing resource wastes of a device, and improves human-computer interaction efficiency and utilization of a processing resource of the device.

The following uses an example in which the virtual scene is a game scene to describe an exemplary application of the embodiments of this disclosure in a practical application scene. Terms involved in the embodiments of this disclosure are first described briefly, including: (1) a resurrection mechanism: in a virtual shooting game, there is a playing mechanism capable of resurrecting a virtual object that is controlled by a player and that is killed, generally including in-situ resurrection and remote resurrection. In-situ resurrection means resurrection at a position where the player is killed. Remote resurrection means resurrection at another position at a specific distance from the position where the player is killed.

In the related art, the resurrection mechanism for a virtual object (including, but not limited to, returning to a birth point after the virtual object is killed) is often not real-time. The following two solutions are generally used for remote resurrection. (1) The virtual object controlled by the player may be immediately resurrected beside any teammate in the game after being killed, but no status (including a health point, equipment, and the like) before the virtual object is killed is recorded during resurrection. Although implementing remote resurrection, the resurrection mechanism is not real-time, and cannot retain the status of the virtual object before resurrection, resulting in poor experience of the player. (2) The virtual object controlled by player may be immediately resurrected at a fixed resurrection point after being killed, and no status (including a health point, equipment, and the like) before the virtual object is killed is recorded during resurrection. Although remote resurrection is implemented, the status before the virtual object is killed cannot be retained. Since resurrection may be implemented at only the resurrection point, and the equipment, the status, and the like obtained before the virtual object is killed cannot be retained, tactical operation space of the player is restricted greatly.

Based on this, an embodiment of this disclosure provides a method for controlling an object in a virtual scene, that is, a solution in which a copied character (that is, the foregoing virtual object copy) of a main character (that is, the foregoing virtual object) is created in a virtual scene to implement real-time remote resurrection. Within effect-taking duration of a copy skill that is cast by a player and has a resurrection mechanism, the copied character of the main character is created, and the main character is hidden. When the copied character is killed or another disappearing condition is satisfied (for example, display duration of the copied character reaches specific duration), the resurrection mechanism is triggered. In this case, presentation of the copied character is canceled, and the hidden main character is displayed, to implement remote resurrection. In addition, the remotely resurrected main character (that is, the main character that is presented again) may obtain an interaction attribute (that is, equipment and a status) during casting of the copy skill, for example, a health point, an attack value, a defense value, or a gun holding status.

Figure 11:
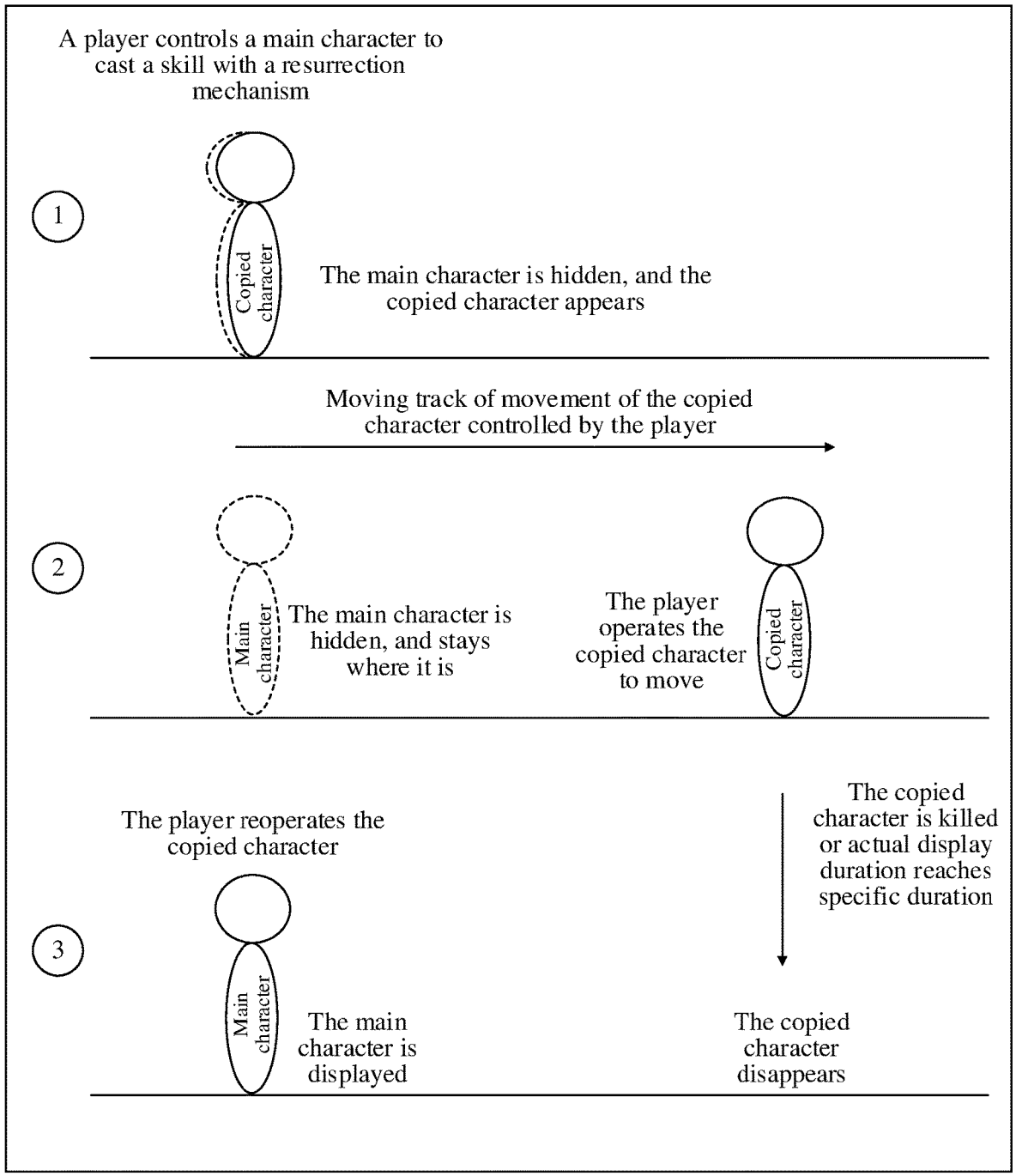
FIG. 11 is a schematic diagram of displaying an object in a virtual scene according to an embodiment of this disclosure.

FIG. 11 is a schematic diagram of displaying an object in the virtual scene according to an embodiment of this disclosure. Here, for example, after casting the copy skill with the resurrection mechanism, the player may copy the main character to obtain the operable copied character. The copied character completely copies the equipment, the status, and the like of the main character. In this case, the player may start to control the copied character to interact in a game scene, and the main character stays where it is, and is hidden. When actual display duration of the copied character reaches the specific duration or the condition that the copied character is killed is satisfied, the copied character disappears, the player regains control over the main character, and the main character is displayed. In this case, the main character still retains an interaction attribute (that is, the equipment and the status) during casting of the copy skill. By using the solution, real-time remote resurrection may be implemented.

Figure 12:
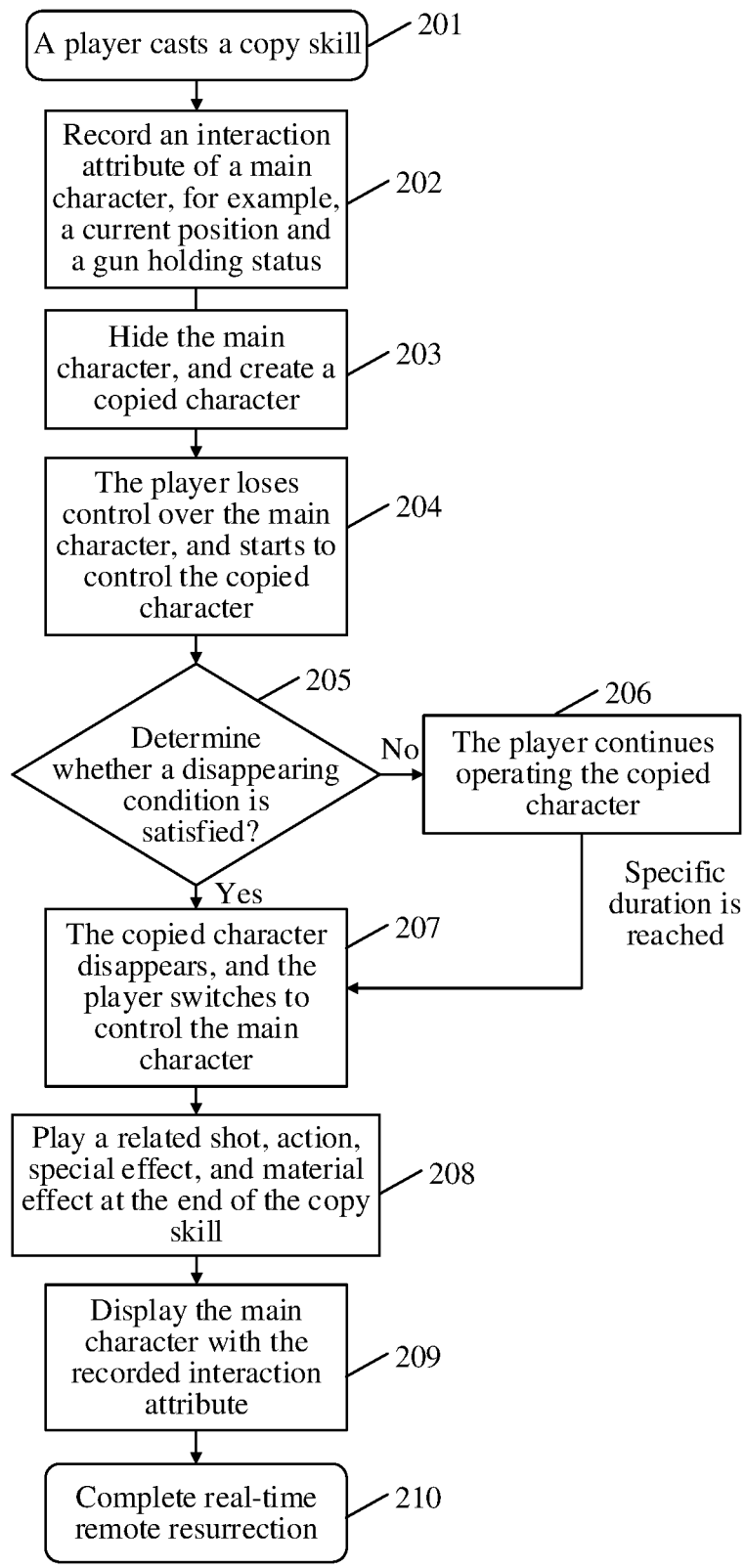
FIG. 12 is a schematic flowchart of a method for controlling an object in a virtual scene according to an embodiment of this disclosure.

FIG. 12 is a schematic flowchart of the method for controlling an object in a virtual scene according to an embodiment of this disclosure, including the following steps.

Step 201: The player casts the copy skill. Step 202: Record the interaction attribute of the main character, for example, a current position and the gun holding status. Step 203: Hide the main character, and create the copied character. Step 204: The player loses control over the main character, and starts to control the copied character. Step 205: Determine whether a disappearing condition of the copied character is satisfied. If the disappearing condition of the copied character is not satisfied, step 206 is performed; or if the disappearing condition of the copied character is satisfied, step 207 is performed. Step 206: The player continues controlling the copied character. After the specific duration is reached, step 207 is performed. Step 207: The copied character disappears, and the player switches to control the main character. Step 208: Play a related shot, action, special effect, and material effect at the end of the copy skill. Step 209: Display the main character with the recorded interaction attribute. Step 210: Complete real-time remote resurrection.

In applications, the copy skill supports casting of a plurality of skills, and another nonexclusive skill may coexist with the copy skill. In addition, the real-time resurrection mechanism may be implemented by using a copy skill, or may be implemented by using an unreal engine (UE) 4 plug-in gameplay ability system. In some other embodiments, more equipment props or character skills may be added, for example, masking displaying of a flight path and an interference trajectory of a projectile, such that the player learns to use a more complex prop or skill in combination with tactics. In addition, displaying of a flight trajectory and a collision effect of a projectile or character skill is attenuated due to a material, a thickness, and the like of an obstacle, to bring more changes to the player in a battle.

Figure 13:
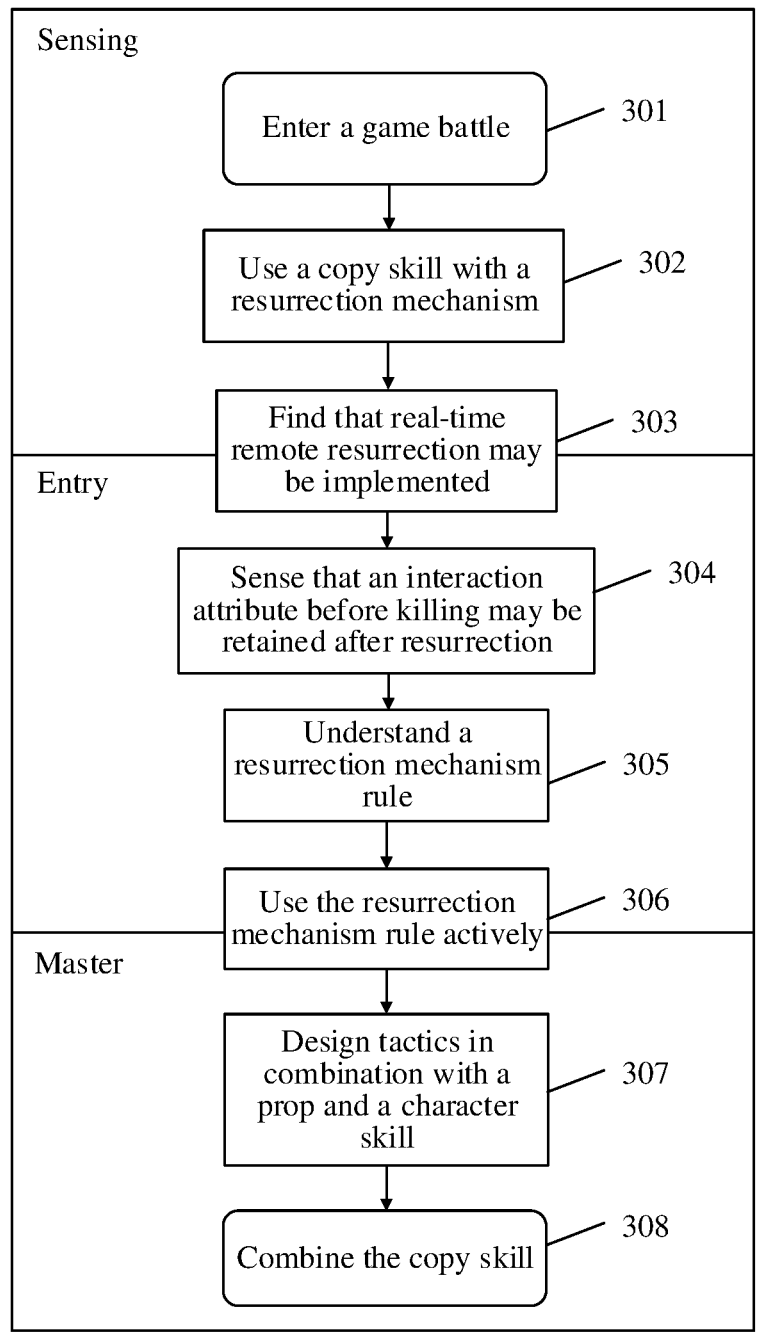
FIG. 13 is a schematic flowchart of using a skill with a resurrection mechanism according to an embodiment of this disclosure.

FIG. 13 is a schematic flowchart of using the skill with the resurrection mechanism according to an embodiment of this disclosure. It may be understood that an understanding process of the copy skill by the player includes the following steps. Step 301: Enter a game battle. Step 302: Use the copy skill with the resurrection mechanism. Step 303: Find that real-time remote resurrection may be implemented. Step 304: Sense that the interaction attribute before killing may be retained after resurrection. Step 305: Understand a resurrection mechanism rule. Step 306: Use the resurrection mechanism rule actively. Step 307: Design tactics in combination with a prop and a character skill. Step 308: Combine the copy skill with the resurrection mechanism to enrich playing routines.

Figure 14:
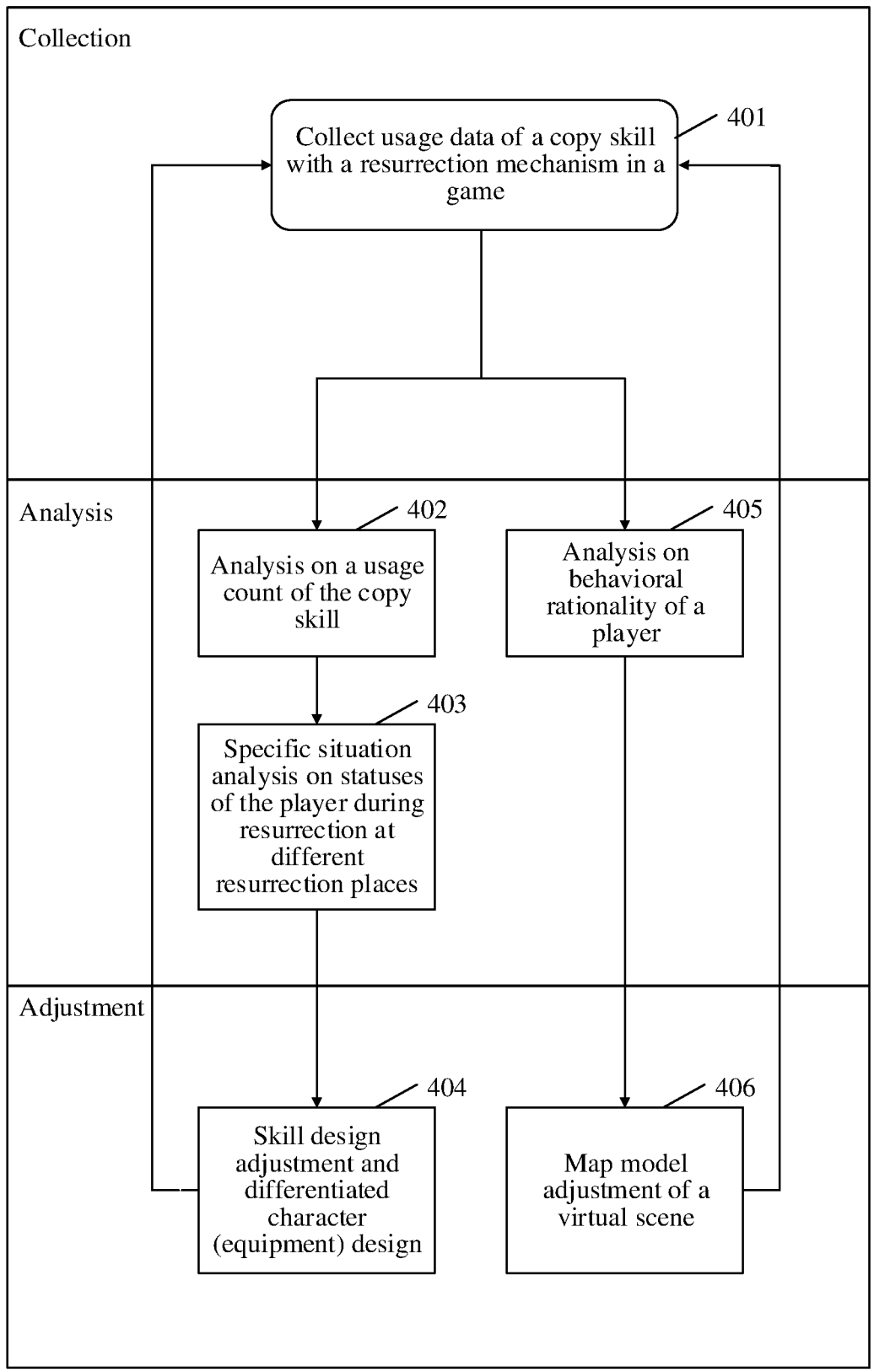
FIG. 14 is a schematic flowchart of performing data analysis by using a skill with a resurrection mechanism according to an embodiment of this disclosure.

FIG. 14 is a schematic flowchart of performing data analysis by using the skill with the resurrection mechanism according to an embodiment of this disclosure. It may be understood as iteration space of a background system. The following steps are included. Step 401: Collect usage data of the copy skill with the resurrection mechanism in the game. Step 402: Perform analysis on a usage count of the copy skill. Step 403: Perform specific situation analysis on statuses of the player during resurrection at different resurrection places. Step 404: Perform skill design adjustment and differentiated character (equipment) design. Step 405: Perform analysis on behavioral rationality of the player. Step 406: Perform map model adjustment.

First, after resurrected, the player may obtain the same equipment and the status as those before the virtual object is killed, and thus a lower learning threshold and better game experience may be provided for the player in actual experience. Second, the player may cast the skill with the resurrection mechanism anytime, that is, the player may be resurrected anywhere, so that the player is inspired to plan a rational battle path to experience a deeper map game, and may design tactics in combination with the prop and the character skill to enrich the playing routines. Third, effect-taking time of the copy skill of the prop or the skill and a map model are adjusted by analyzing a specific situation of a copy skill using place (status) and behavioral rationality of the player, which not only provides fair competition experience for the player, but also considers adjustment space for iterative optimization. Based on this, real-time remote resurrection is possible. For example, a hiding point for casting a resurrection skill is set during map design, but the user actually does not cast the resurrection skill at the hiding point. In this case, the map model of the virtual scene may be updated based on the analytical data to reset the hiding point. For another example, the effect-taking duration of the skill may be set according to a character level or a game account level of the user. If the level is higher, the effect-taking duration is longer.

With application of the foregoing embodiments, (1) after casting the skill with the resurrection mechanism, the player may obtain the equipment and the status during casting of the skill after remote resurrection, so that a lower learning threshold and better game experience are provided for the player. (2) The player may be resurrected where the skill with the resurrection mechanism is cast, no more limited to be beside a teammate or at the resurrection point, so that larger operation space is provided for the player, and richer mastering space is provided for the player. (3) A map game depth of the player may be increased while basic settings of a playing method, a map, a firearm, and the like remain unchanged, so that more routes and strategies may be selected in a mobile shooting game. (4) Usage of the skill with the resurrection mechanism by the player and an enemy killing and number depletion situation are recorded in background, so that the behavioral rationality of the player may be analyzed in combination with big data to effectively create a map model with a larger game depth.

It may be understood that related data such as user information is involved in the embodiments of this disclosure. When the embodiments of this disclosure are applied to a specific product or technology, a license or consent of the user is required to be obtained, and collection, use, and processing of the related data are required to comply with related laws and regulations and standards of related countries and regions.

The following then describes an exemplary structure of the apparatus 555 for controlling an object in a virtual scene in the embodiments of this disclosure, which is implemented as software modules. In some embodiments, as shown in FIG. 2, the apparatus 555 for controlling an object in a virtual scene in a memory 550 may include the following software modules: the first presentation module 5551, configured to present, in response to a casting instruction for a copy skill corresponding to a virtual object in a virtual scene, a virtual object copy obtained through copy based on the virtual object, and hide the presented virtual object; the control module 5552, configured to control, in response to an interaction control instruction for the virtual object copy, the virtual object copy to perform, in the virtual scene, an interactive operation indicated by the interaction control instruction; and the second presentation module 5553, configured to cancel presentation of the virtual object copy in a case that a disappearing condition of the virtual object copy is satisfied during the interactive operation of the virtual object copy, and present the virtual object again. An interaction attribute of the virtual object that is presented again is consistent with that of the virtual object during casting of the copy skill.

In some embodiments, the first presentation module 5551 is further configured to present a skill control corresponding to the copy skill, and receive, in response to a trigger operation on the skill control in a case that the skill control is in an active state, the casting instruction for the copy skill corresponding to the virtual object.

In some embodiments, the first presentation module 5551 is further configured to present the skill control that corresponds to the copy skill and that is in a cooldown state. The first presentation module 5551 is further configured to obtain a cooldown time interval and a cooldown starting time point of the skill control, and control, in response to determining based on the cooldown time interval and the cooldown starting time point that a cooldown ending time point of the skill control is reached, the skill control to be switched from the cooldown state to the active state.

In some embodiments, the first presentation module 5551 is further configured to obtain an interaction result obtained by controlling the virtual object to interact in the virtual scene, and control, in response to determining based on the interaction result that an activation condition of the skill control is satisfied, the skill control to be in the active state.

In some embodiments, the first presentation module 5551 is further configured to present a virtual prop corresponding to the copy skill in a picture of the virtual scene, and receive, in a case that the virtual object is successfully fitted with the virtual prop, the casting instruction for the copy skill corresponding to the virtual object.

In some embodiments, the first presentation module 5551 is further configured to present, in a case that the virtual object is within a sensing range of the virtual prop, a fitting function item corresponding to the virtual prop, and control, in response to a trigger operation on the fitting function item, the virtual object to be fitted with the virtual prop.

In some embodiments, the first presentation module 5551 is further configured to: receive the release instruction, and obtain a casting count of the copy skill; and trigger a response to the casting instruction in a case that the casting count does not reach a count threshold.

In some embodiments, in a case that the copy skill is cast, the virtual object is at a first position in the virtual scene, and a position at which the virtual object copy disappears is different from the first position. The second presentation module 5553 is further configured to present the virtual object again at the first position.

In some embodiments, the virtual object copy disappears at a second position in the virtual scene. The second presentation module 5553 is further configured to present the virtual object again at a third position in the virtual scene. The third position is a position whose distance from the second position exceeds a distance threshold in the virtual scene.

In some embodiments, the second presentation module 5553 is further configured to present a status attribute value of the virtual object copy during the interactive operation of the virtual object copy, and determine, in a case that the status attribute value is less than a status threshold or returns to zero, that the disappearing condition of the virtual object copy is satisfied.

In some embodiments, the second presentation module 5553 is further configured to present remaining display duration of the virtual object copy during the interactive operation of the virtual object copy, and determine, in a case that the remaining display duration is less than a duration threshold or returns to zero, that the disappearing condition of the virtual object copy is satisfied.

In some embodiments, the second presentation module 5553 is further configured to obtain a status attribute value and display duration of the virtual object copy during the interactive operation of the virtual object copy, and determine, in a case that at least one of the following is satisfied, that the disappearing condition of the virtual object copy is satisfied: the status attribute value is less than a status threshold, and the display duration reaches target display duration.

In some embodiments, the second presentation module 5553 is further configured to obtain an interaction level of the virtual object, determine, based on a correspondence between an interaction level and copy display duration, target copy display duration corresponding to the interaction level of the virtual object, and determine the target copy display duration as the target display duration.

In some embodiments, the apparatus further includes: a third presentation module, configured to present, in a case that the virtual object is within a sensing range of a target hiding position, position recommendation information corresponding to the target hiding position. The position recommendation information is used for indicating a recommendation degree of controlling the virtual object to cast the copy skill at the target hiding position.

In some embodiments, the second presentation module 5553 is further configured to present status indication information of the hidden virtual object during the interactive operation of the virtual object copy. The status indication information is used for indicating real-time scene information in a sensing region centered about the virtual object.

In some embodiments, the second presentation module 5553 is further configured to present, in a case that the status indication information indicates that there is an interaction risk for the virtual object, an ending function item corresponding to the virtual object copy, and determine, in response to receiving a trigger operation on the ending function item, that the disappearing condition of the virtual object copy is satisfied.

With application of the foregoing embodiments, when the casting instruction for the copy skill corresponding to the virtual object in the virtual scene is received, the virtual object copy obtained by copying the virtual object is presented, and the presented virtual object is hidden. The virtual object copy may be controlled by triggering the interaction control instruction for the virtual object copy, to perform, in the virtual scene, the interactive operation indicated by the interaction control instruction. If the disappearing condition of the virtual object copy is satisfied during the interactive operation of the virtual object copy, presentation of the virtual object copy is canceled to make the virtual object copy disappear, and the virtual object is presented again, thereby continuing to control the virtual object to interact in the virtual scene.

Here, (1) the virtual object is copied by using the copy skill to obtain the virtual object copy, and a user may control the virtual object copy to interact in the virtual scene. When the disappearing condition of the virtual object copy is satisfied, the virtual object copy is controlled to disappear, the virtual object is presented again, and the user may continue to control the virtual object to interact in the virtual scene. Therefore, an entire process includes disappearance of the virtual object (specifically disappearance of the virtual object copy) and presenting the virtual object again. In other words, disappearance and resurrection of the virtual object are implemented. (2) The interaction attribute of the virtual object that is presented again is consistent with that of the virtual object during casting of the copy skill. Therefore, the interaction attribute of the virtual object during casting of the copy skill is retained, and is not required to be resumed through a manual operation from an initial state. This reduces processing resource wastes of a device, and improves human-computer interaction efficiency and utilization of a processing resource of the device.

An embodiment of this disclosure also provides an electronic device. The electronic device includes: a memory, configured to store computer-executable instructions; and a processor, configured to execute the computer-executable instructions stored in the memory to implement the method for controlling an object in a virtual scene in the embodiments of this disclosure.

An embodiment of this disclosure also provides a computer program product or computer program. The computer program product or computer program includes computer-executable instructions. The computer-executable instructions are stored in a computer-readable storage medium. A processor of a computer device reads the computer-executable instructions from the computer-readable storage medium. The processor executes the computer-executable instructions to enable the computer device to perform the method for controlling an object in a virtual scene in the embodiments of this disclosure.

An embodiment of this disclosure also provides a computer-readable storage medium, storing computer-executable instructions. The computer-executable instructions are executed by a processor to implement the method for controlling an object in a virtual scene in the embodiments of this disclosure.

In some embodiments, the computer-readable storage medium may be a memory, for example, a ferroelectric random access memory (FRAM), a read-only memory (ROM), a programmable ROM (PROM), an erasable PROM (EPROM), an electrically EPROM (EEPROM), a flash memory, a magnetic surface memory, an optical disk, or a compact disk ROM (CD-ROM), or may be various devices including one or any combination of the foregoing memories.

In some embodiments, the computer-executable instruction may be compiled according to any form of programming language (including a compiling or interpretive language, or a declarative or procedural language) in a form of a program, software, a software module, a script, or a code, and may be deployed according to any form, including deployed as an independent program or deployed as a module, a component, a subroutine, or another unit suitable to be used in a computing environment.

For example, the computer-executable instruction may but not always correspond to a file in a file system, and may be stored in a part of a file that stores another program or data, for example, stored in one or more scripts in a hyper text markup language (HTML) document, stored in a single file dedicated to a discussed program, or stored in a plurality of collaborative files (for example, files storing one or more modules, subprograms, or code parts).

For example, the computer-executable instruction may be deployed in a computing device for execution, or executed in a plurality of computing devices at the same place, or executed in a plurality of computing devices that are interconnected through a communication network at a plurality of places.

Accordingly, in the embodiments of this disclosure, when the casting instruction for the copy skill corresponding to the virtual object in the virtual scene is received, the virtual object copy obtained by copying the virtual object is presented, and the presented virtual object is hidden. The virtual object copy may be controlled by triggering the interaction control instruction for the virtual object copy, to perform, in the virtual scene, the interactive operation indicated by the interaction control instruction. If the disappearing condition of the virtual object copy is satisfied during the interactive operation of the virtual object copy, presentation of the virtual object copy is canceled to make the virtual object copy disappear, and the virtual object is presented again, thereby continuing to control the virtual object to interact in the virtual scene.

Here, (1) the virtual object is copied by using the copy skill to obtain the virtual object copy, and a user may control the virtual object copy to interact in the virtual scene. When the disappearing condition of the virtual object copy is satisfied, the virtual object copy is controlled to disappear, the virtual object is presented again, and the user may continue to control the virtual object to interact in the virtual scene. Therefore, an entire process includes disappearance of the virtual object (specifically disappearance of the virtual object copy) and presenting the virtual object again. In other words, disappearance and resurrection of the virtual object are implemented. (2) The interaction attribute of the virtual object that is presented again is consistent with that of the virtual object during casting of the copy skill. Therefore, the interaction attribute of the virtual object during casting of the copy skill is retained, and is not required to be resumed through a manual operation from an initial state. This reduces processing resource wastes of a device, and improves human-computer interaction efficiency and utilization of a processing resource of the device.

The above only describes some embodiments of this disclosure and not intended to limit the protection scope of this disclosure. Any modification, equivalent replacement, improvement, and the like made within the spirit and scope of this disclosure fall within the protection scope of this disclosure.

What is claimed is:

1. A method for controlling an object in a virtual scene for an electronic device, comprising:
controlling, in response to a first interaction control instruction, a virtual object to perform an interactive operation indicated by the first interaction control instruction;
controlling, in response to a second interaction control instruction for a copy skill, the virtual object to cast the copy skill comprising:
creating a copy of the virtual object in the virtual scene;

controlling, in response to a third interaction control instruction, the copy to perform an interactive operation indicated by the third interaction control instruction;

removing the copy from the virtual scene in response to that a disappearing condition of the copy of the virtual object copy is satisfied; and controlling, in response to a fourth interaction control instruction, the virtual object to perform an interactive operation indicated by the fourth interaction control instruction.

2. The method according to claim 1, wherein the virtual object maintains a same state before and after the controlling the copy to perform an interactive operation indicated by the third interaction control instruction.

3. The method according to claim 1, wherein the same state comprises at least one of:
a health state, a skill state, and an equipment state.

4. The method according to claim 1, wherein the same state comprises a position state in the virtual scene.

5. The method according to claim 1, further comprising:
hiding the virtual object in response to the second interaction control instruction for a copy skill.

6. The method according to claim 1, wherein the disappearing condition comprises at least one of:
the copy being eliminated from the virtual scene; and
receiving an ending instruction for the copy skill.

7. The method according to claim 1, wherein the disappearing condition is a duration for the copy is over.

8. The method according to claim 1, further comprising:
enabling the copy skill for the virtual object in response to a corresponding virtual prop being carried by the virtual object.

9. The method according to claim 5, further comprising:
recommending a hiding position for the virtual object to cast the copy skill.

10. The method according to claim 1, further comprising:
displaying information associated with the virtual object while controlling the copy.

11. The method according to claim 10, the information being a risk determined within a region centered at the virtual object.

12. The method according to claim 1, wherein the copy is controlled under a first-person perspective or a third-person perspective.

13. An electronic device for controlling an object in a virtual scene, comprising:
a memory, configured to store computer-executable instructions; and
at least one processor, configured to execute the computer-executable instructions stored in the memory to perform:

controlling, in response to a first interaction control instruction, a virtual object to perform an interactive operation indicated by the first interaction control instruction;

controlling, in response to a second interaction control instruction for a copy skill, the virtual object to cast the copy skill comprising:
creating a copy of the virtual object in the virtual scene;
controlling, in response to a third interaction control instruction, the copy to perform an interactive operation indicated by the third interaction control instruction;

removing the copy from the virtual scene in response to that a disappearing condition of the copy of the virtual object is satisfied; and controlling, in response to a fourth interaction control instruction, the virtual object to perform an interactive operation indicated by the fourth interaction control instruction.

14. The electronic device according to claim 13, wherein the processor is configured to perform:
presenting a skill control corresponding to the copy skill; and
receiving, in response to a trigger operation on the skill control in a case that the skill control is in an active state, the casting instruction for the copy skill corresponding to the virtual object.

15. A non-transitory computer-readable storage medium storing computer-executable instructions executable by at least one processor to implement:
controlling, in response to a first interaction control instruction, a virtual object to perform an interactive operation indicated by the first interaction control instruction;

controlling, in response to a second interaction control instruction for a copy skill, the virtual object to cast the copy skill comprising:
creating a copy of the virtual object in the virtual scene;
controlling, in response to a third interaction control instruction, the copy to perform an interactive operation indicated by the third interaction control instruction;

removing the copy from the virtual scene in response to that a disappearing condition of the copy of the virtual object is satisfied; and controlling, in response to a fourth interaction control instruction, the virtual object to perform an interactive operation indicated by the fourth interaction control instruction.

* * * * *